United States Patent [19]
Odaka et al.

[11] Patent Number: 5,742,344
[45] Date of Patent: Apr. 21, 1998

[54] MOTION COMPENSATED VIDEO DECODING METHOD AND SYSTEM FOR DECODING A CODED VIDEO SIGNAL USING SPATIAL AND TEMPORAL FILTERING

[75] Inventors: Toshinori Odaka, Yokohama; Yoshiharu Uetani, Kawasaki; Tadaaki Masuda, Tokyo; Tomoo Yamakage, Kawasaki; Hideyuki Ueno, Tokyo; Noboru Yamaguchi, Yashio; Yoshihiro Kikuchi, Yokohama; Tadahiro Oku, Urayasu, all of Japan

[73] Assignee: Kabushiki Kaisha Toshiba, Kawasaki, Japan

[21] Appl. No.: 626,969

[22] Filed: Apr. 3, 1996

Related U.S. Application Data

[62] Division of Ser. No. 295,421, Aug. 25, 1994, Pat. No. 5,541,661, which is a continuation of Ser. No. 156,709, Nov. 24, 1993, Pat. No. 5,424,779, which is a continuation of Ser. No. 890,705, May 29, 1992, Pat. No. 5,317,397.

[30] Foreign Application Priority Data

| May 31, 1991 | [JP] | Japan | 3-130012 |
| Oct. 17, 1991 | [JP] | Japan | 3-298316 |
| Oct. 17, 1991 | [JP] | Japan | 3-298317 |
| Oct. 31, 1991 | [JP] | Japan | 3-286855 |
| Feb. 18, 1992 | [JP] | Japan | 4-30923 |

[51] Int. Cl.$^6$ ............................................. H04N 7/32
[52] U.S. Cl. ........................................ 348/416; 348/699
[58] Field of Search ...................... 348/416, 699, 348/700, 701, 402, 401, 400, 415, 409, 390, 384; 382/233, 236, 238, 232; H04N 7/137

[56] References Cited

U.S. PATENT DOCUMENTS

| 4,460,923 | 7/1984 | Hirano et al. | 348/413 |
| 4,571,618 | 2/1986 | Hatori et al. | 348/412 |
| 4,816,906 | 3/1989 | Kummerfeldt et al. | 348/402 |
| 4,951,140 | 8/1990 | Ueno et al. | 348/413 |

(List continued on next page.)

FOREIGN PATENT DOCUMENTS 3-226193  10/1991  Japan.

OTHER PUBLICATIONS

1991 Spring National Convention of the Institute of Electronics, Information and Communication Engineers, p.7–64, Mar. 26–29, 1991, Hirofumi Nishikawa, et al., "A Study on Frame/Field Motion Compensation for Storage Media" (with English translation).

PCSJ'90, pp. 175–177, Oct. 1990, Yukitoshi Tuboi, et al., "Adaptive Line Interpolated Inter–Field Motion Compensation Method".

IEEE Trans. CS, vol. 38, pp. 140–142, Jan. 1991, Feng–Ming Wang, et al., "High Quality Coding of the Even Fields Based on the Odds of Interlaced Video Sequences".

PCSJ'92, pp. 193–196, T. Odaka, et al., "An Adaptive Motion Compensated Prediction Method for Interlaced Image" (1992) (Oct.).

Primary Examiner—Bryan S. Tung
Attorney, Agent, or Firm—Oblon, Spivak, McClelland, Maier & Neustadt, P.C.

[57] ABSTRACT

A video coding apparatus comprising a memory for storing a coded picture signal used as a reference picture signal, a vector detecting circuit for detecting, from plural field picture signals or plural frame picture signals which are read out from the memory and the reference picture signals, an optimum motion regarding a picture to be coded, a prediction signal producing circuit for subjecting a spatial-temporal filtering to a reference picture designated by the optimum motion vector to produce a prediction signal, and a coding circuit for coding the to-be coded picture signal on the basis of the prediction signal.

16 Claims, 35 Drawing Sheets

U.S. PATENT DOCUMENTS

| | | | |
|---|---|---|---|
| 4,972,260 | 11/1990 | Fujikawa et al. | 348/405 |
| 4,985,767 | 1/1991 | Haghiri et al. | 348/429 |
| 5,055,925 | 10/1991 | Lamnabhi | 348/699 |
| 5,093,720 | 3/1992 | Krause et al. | 348/452 |
| 5,146,325 | 9/1992 | Ng | 348/384 |
| 5,168,356 | 12/1992 | Acampora et al. | 348/409 |
| 5,173,773 | 12/1992 | Ueda et al. | 348/407 |
| 5,175,618 | 12/1992 | Ueda et al. | 348/416 |
| 5,198,901 | 3/1993 | Lynch | 348/413 |
| 5,317,397 | 5/1994 | Odaka et al. | 348/416 |
| 5,355,378 | 10/1994 | Ohta | 348/413 |
| 5,367,629 | 11/1994 | Chu et al. | 348/403 |
| 5,412,435 | 5/1995 | Nakajima | 348/699 |
| 5,502,489 | 3/1996 | Kim et al. | 348/607 |
| 5,502,510 | 3/1996 | Kim et al. | 348/701 |

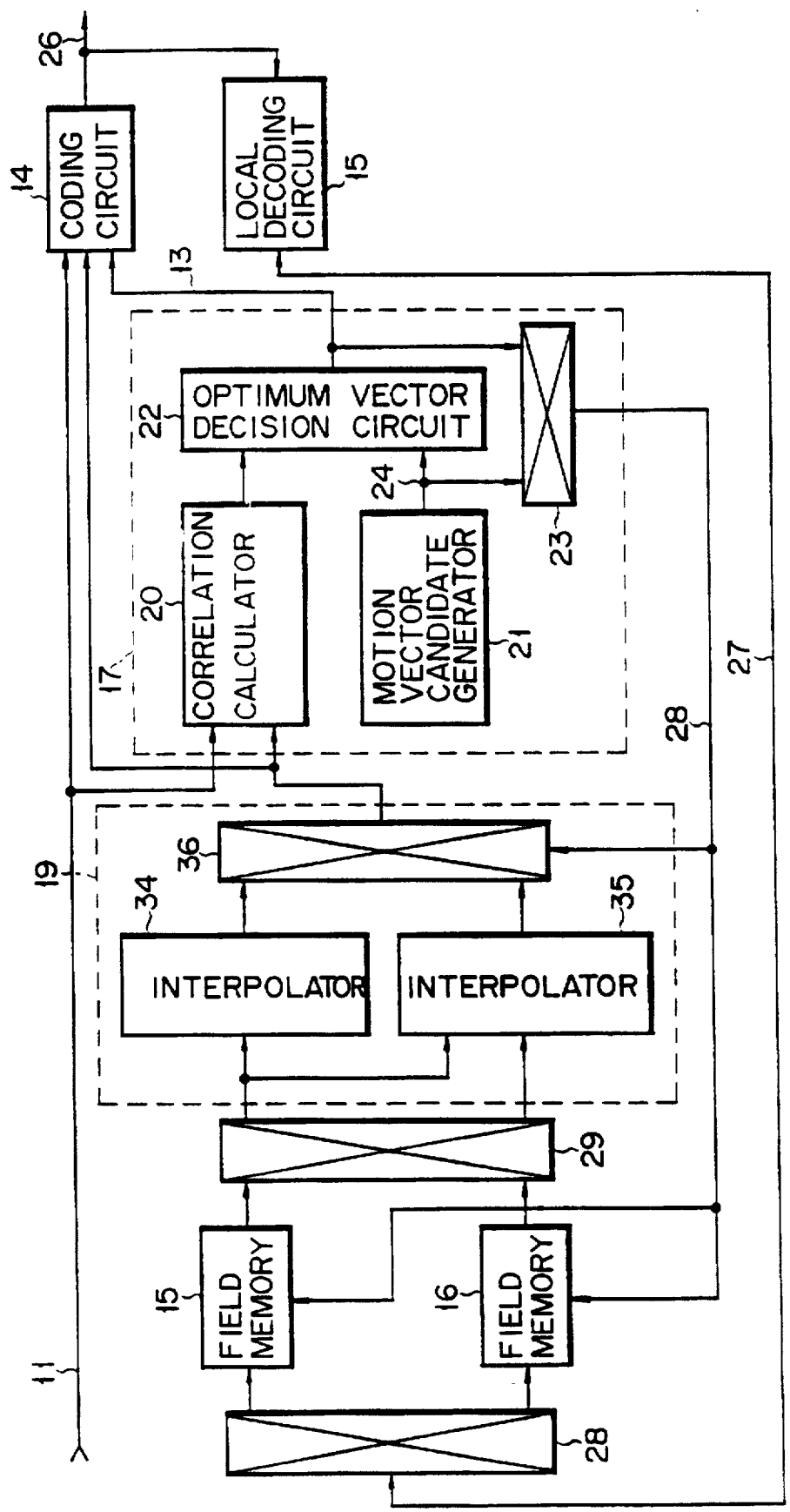
F I G. 5

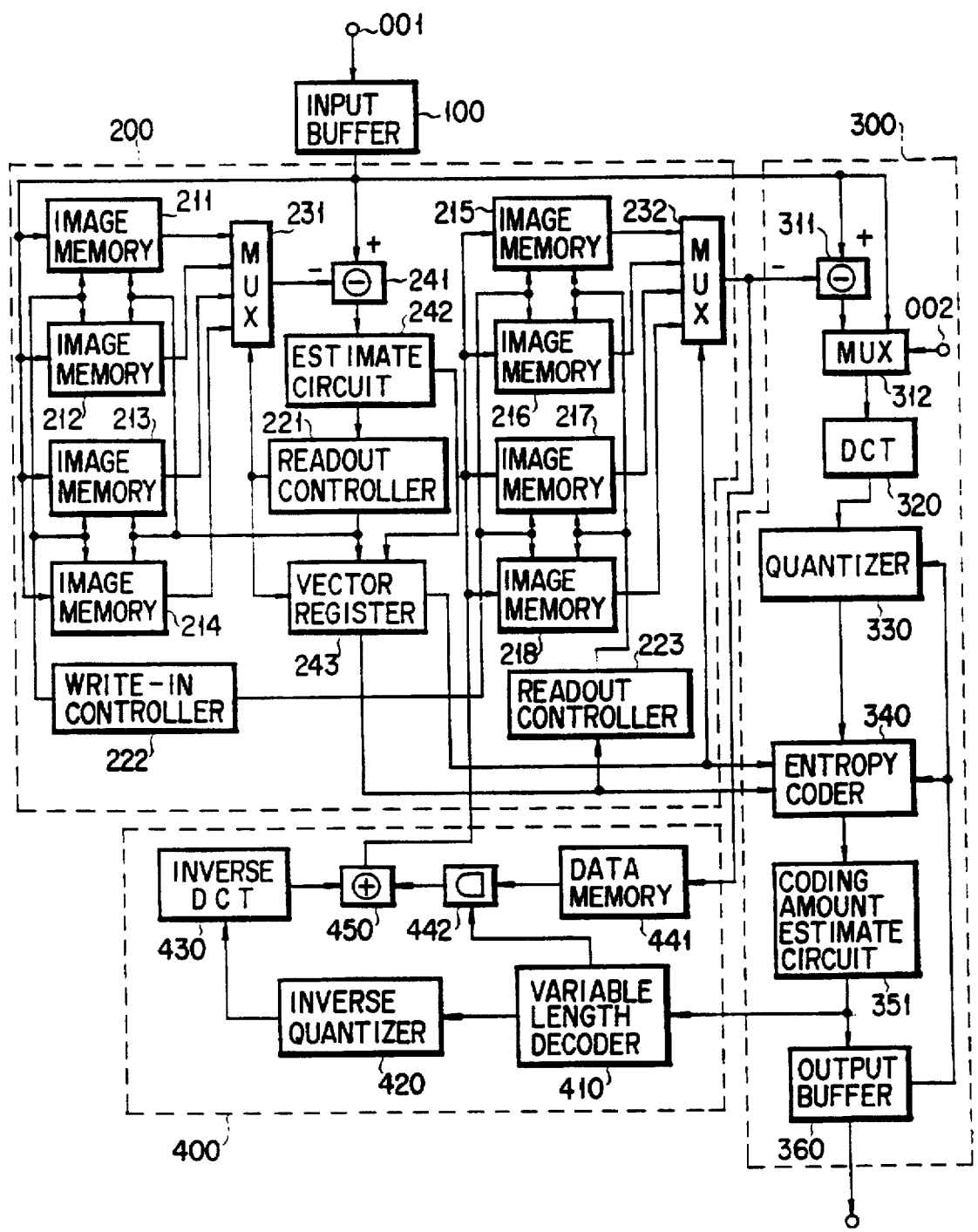
F I G. 7

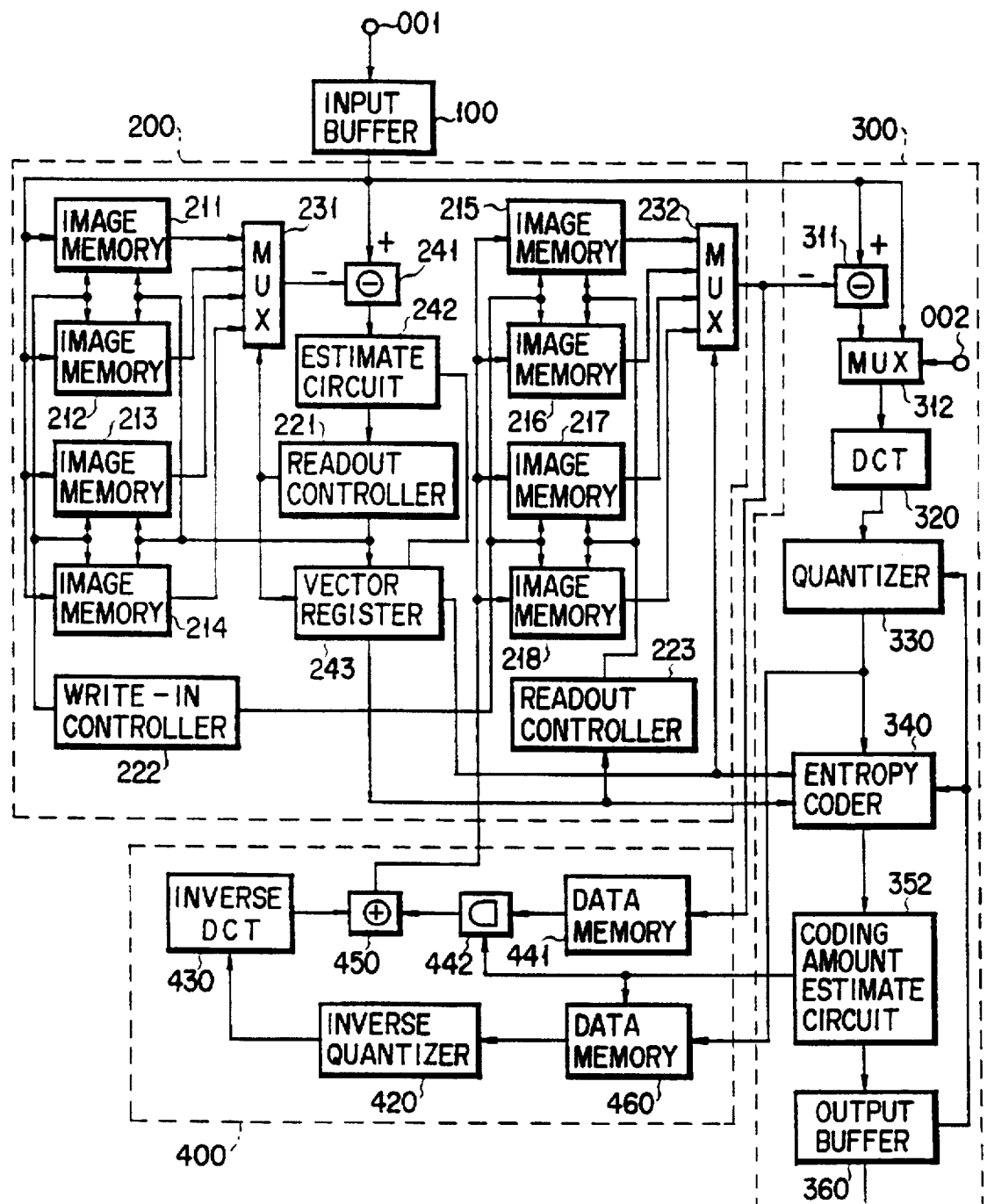
F I G. 8

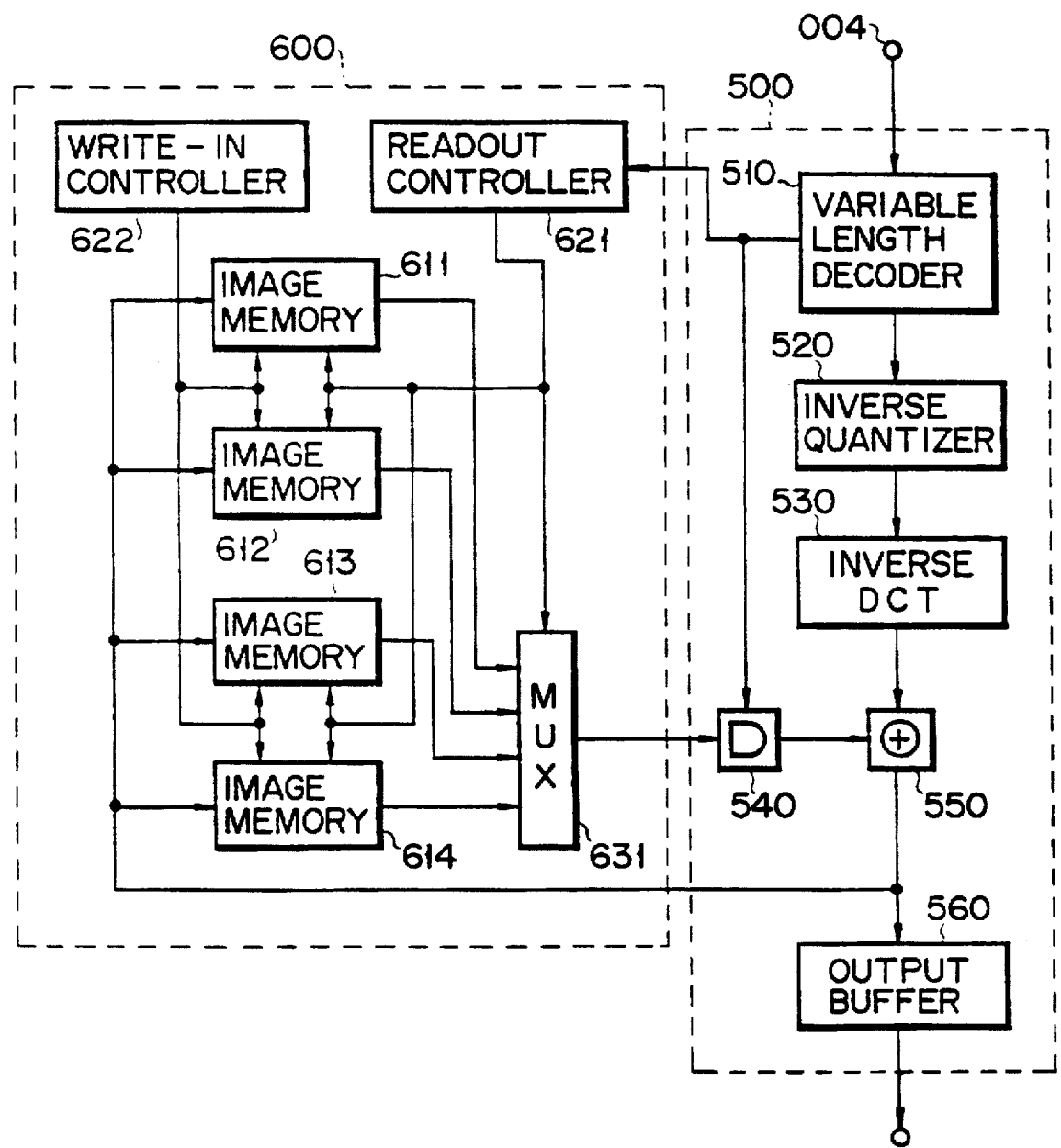
F I G. 10

|     | s1 | s2 | s3 | s4 | s5 | s6 |
|-----|----|----|----|----|----|----|
| 101 | o  | o  | o  | o  | o  | o  |
| 102 | o  | o  | o  | o  | o  | o  |
| 103 | o  | o  | o  | o  | o  | o  |
| 104 | o  | o  | o  | o  | o  | o  |
| 105 | o  | o  | o  | o  | o  | o  |
| 106 | o  | o  | o  | o  | o  | o  |
| 107 | o  | o  | o  | o  | o  | o  |
| 108 | o  | o  | o  | o  | o  | o  |
| 109 | o  | o  | o  | o  | o  | o  |
| 110 | o  | o  | o  | o  | o  | o  |
| 111 | o  | o  | o  | o  | o  | o  |
| 112 | o  | o  | o  | o  | o  | o  |
| 113 | o  | o  | o  | o  | o  | o  |
| 114 | o  | o  | o  | o  | o  | o  |
| 115 | o  | o  | o  | o  | o  | o  |
| 116 | o  | o  | o  | o  | o  | o  |
| 117 | o  | o  | o  | o  | o  | o  |
| 118 | o  | o  | o  | o  | o  | o  |
| 119 | o  | o  | o  | o  | o  | o  |
| 120 | o  | o  | o  | o  | o  | o  |

|     | s1 | s2 | s3 | s4 | s5 | s6 |
|-----|----|----|----|----|----|----|
| 101 | o  | o  | o  | o  | o  | o  |
| 102 | o  | o  | o  | o  | o  | o  |
| 103 | o  | o  | o  | o  | o  | o  |
| 104 | o  | o  | o  | o  | o  | o  |
| 105 | o  | o  | o  | o  | o  | o  |
| 106 | o  | o  | o  | o  | o  | o  |
| 107 | o  | o  | o  | o  | o  | o  |
| 108 | o  | o  | o  | o  | o  | o  |
| 109 | o  | o  | o  | o  | o  | o  |
| 110 | o  | o  | o  | o  | o  | o  |
| 111 | o  | o  | o  | o  | o  | o  |
| 112 | o  | o  | o  | o  | o  | o  |
| 113 | o  | o  | o  | o  | o  | o  |
| 114 | o  | o  | o  | o  | o  | o  |
| 115 | o  | o  | o  | o  | o  | o  |
| 116 | o  | o  | o  | o  | o  | o  |
| 117 | o  | o  | o  | o  | o  | o  |
| 118 | o  | o  | o  | o  | o  | o  |
| 119 | o  | o  | o  | o  | o  | o  |
| 120 | o  | o  | o  | o  | o  | o  |

|     | s1 | s2 | s3 | s4 | s5 | s6 |
|-----|----|----|----|----|----|----|
| 101 | o  | o  | o  | o  | o  | o  |
| 102 | o  | o  | o  | o  | o  | o  |
| 103 | o  | o  | o  | o  | o  | o  |
| 104 | o  | o  | o  | o  | o  | o  |
| 105 | o  | o  | o  | o  | o  | o  |
| 106 | o  | o  | o  | o  | o  | o  |
| 107 | o  | o  | o  | o  | o  | o  |
| 108 | o  | o  | o  | o  | o  | o  |
| 109 | o  | o  | o  | o  | o  | o  |
| 110 | o  | o  | o  | o  | o  | o  |
| 111 | o  | o  | o  | o  | o  | o  |
| 112 | o  | o  | o  | o  | o  | o  |
| 113 | o  | o  | o  | o  | o  | o  |
| 114 | o  | o  | o  | o  | o  | o  |
| 115 | o  | o  | o  | o  | o  | o  |
| 116 | o  | o  | o  | o  | o  | o  |
| 117 | o  | o  | o  | o  | o  | o  |
| 118 | o  | o  | o  | o  | o  | o  |
| 119 | o  | o  | o  | o  | o  | o  |
| 120 | o  | o  | o  | o  | o  | o  |

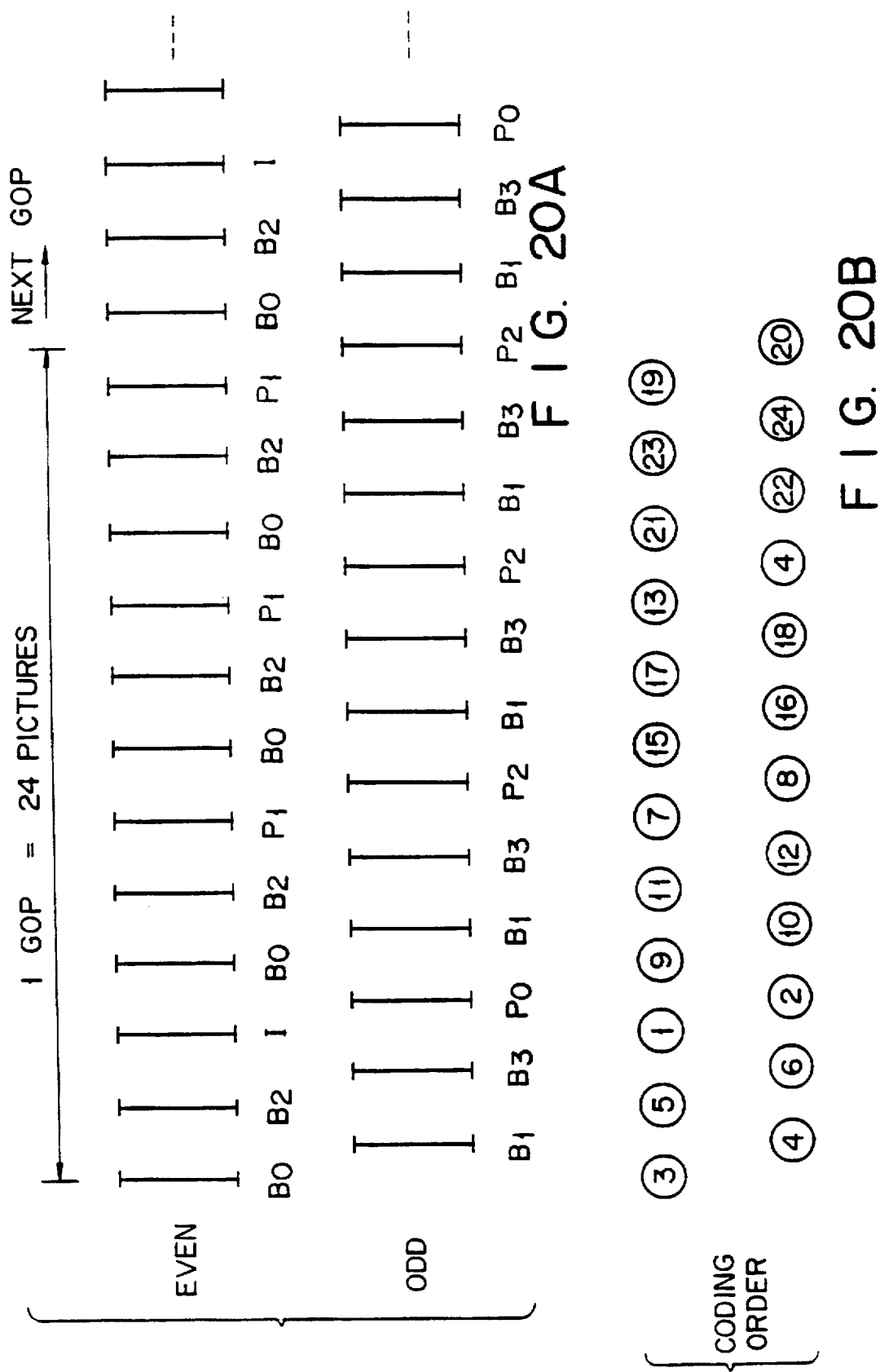

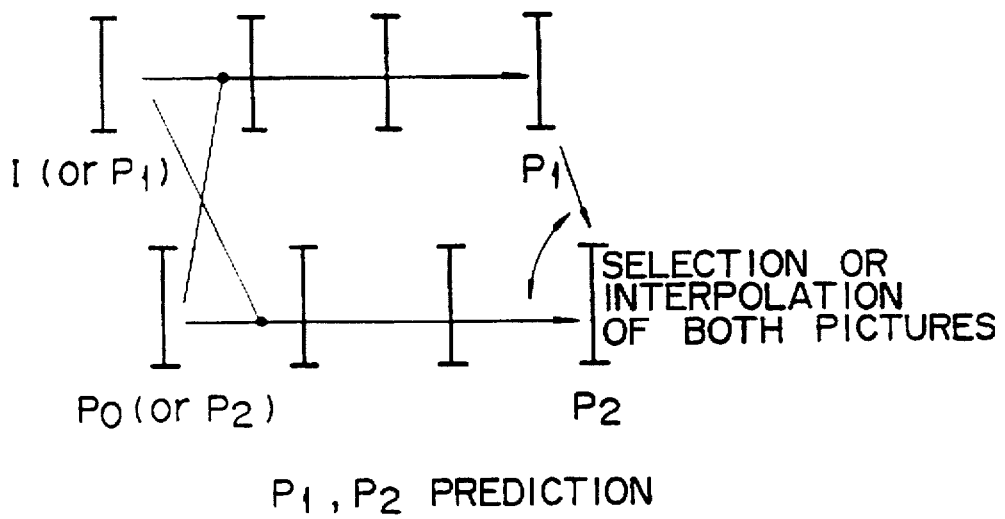
P₁, P₂ PREDICTION
F I G. 21A
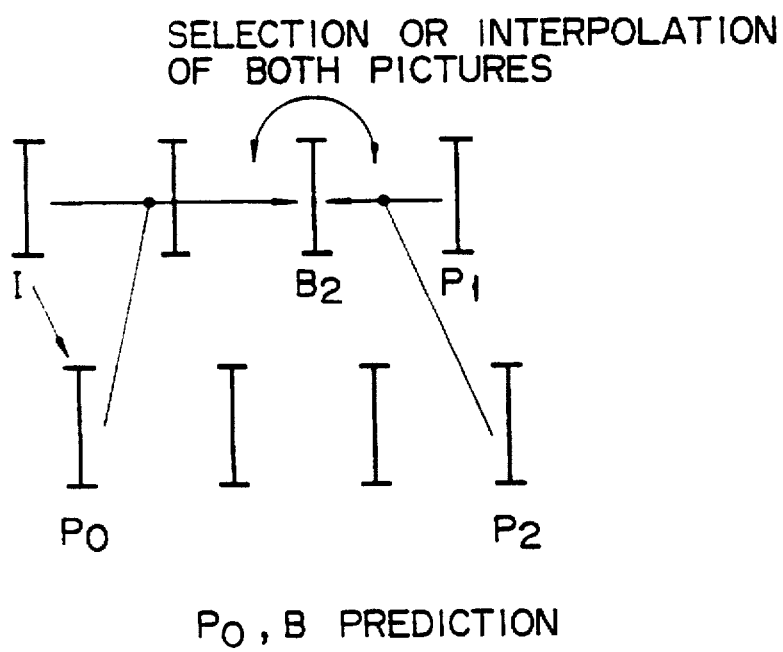
P₀, B PREDICTION
F I G. 21B

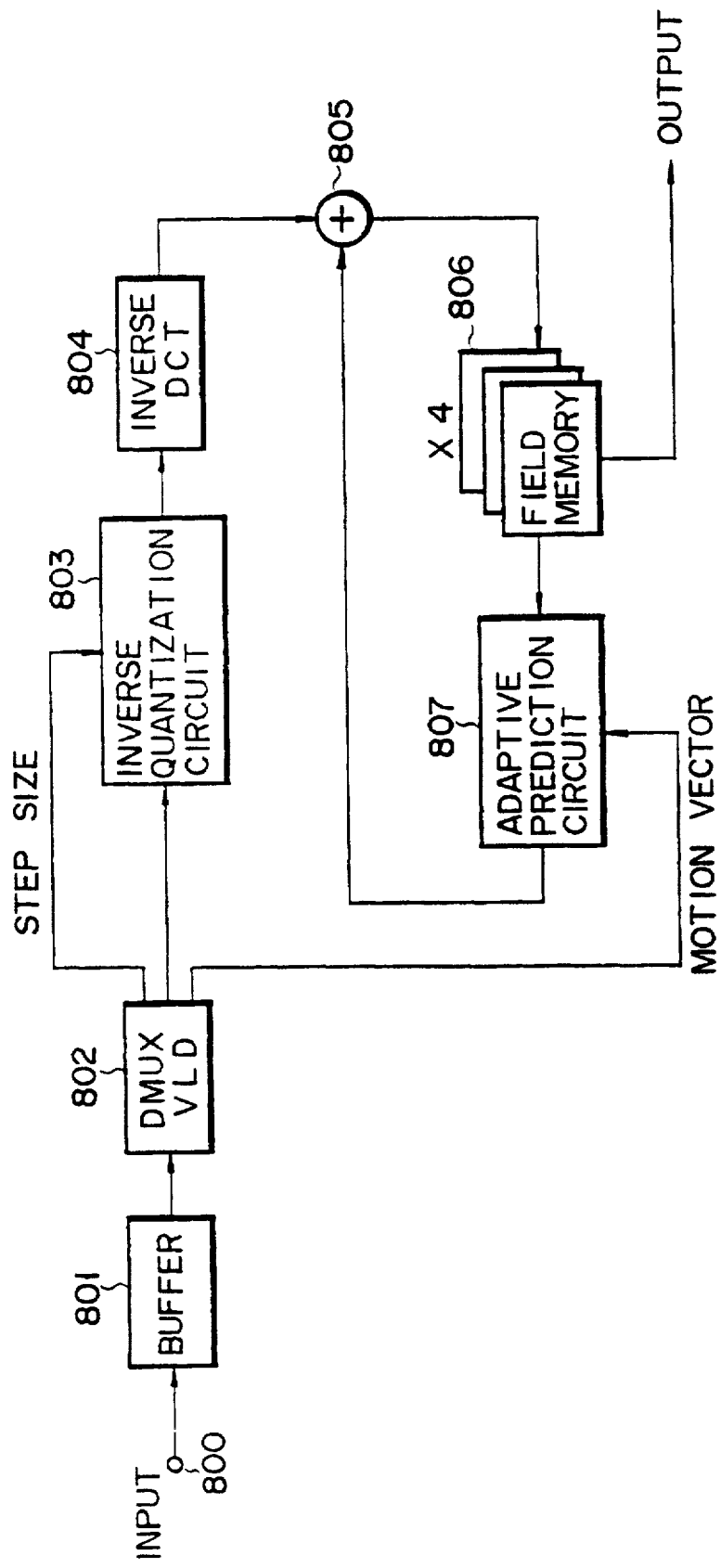
F I G. 22

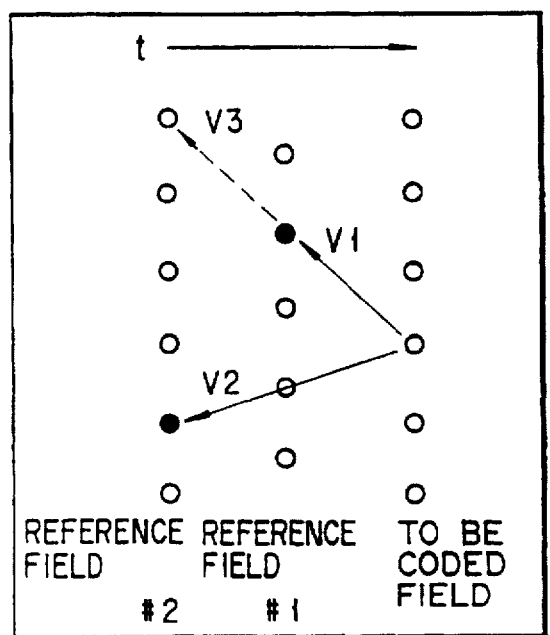
F I G. 25A
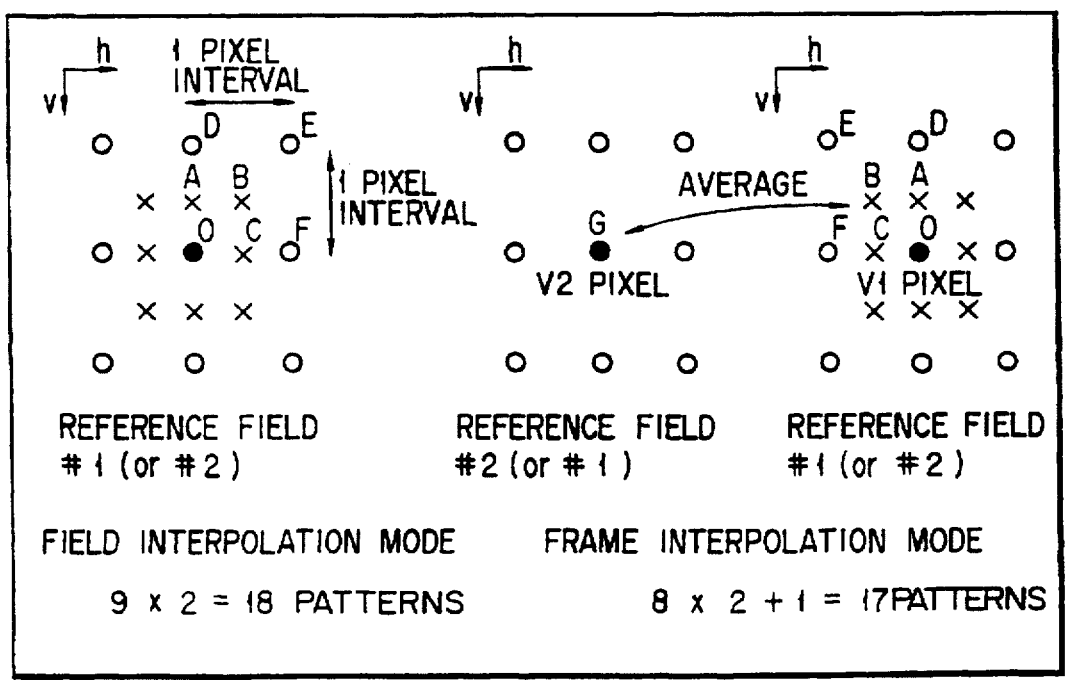
F I G. 25B

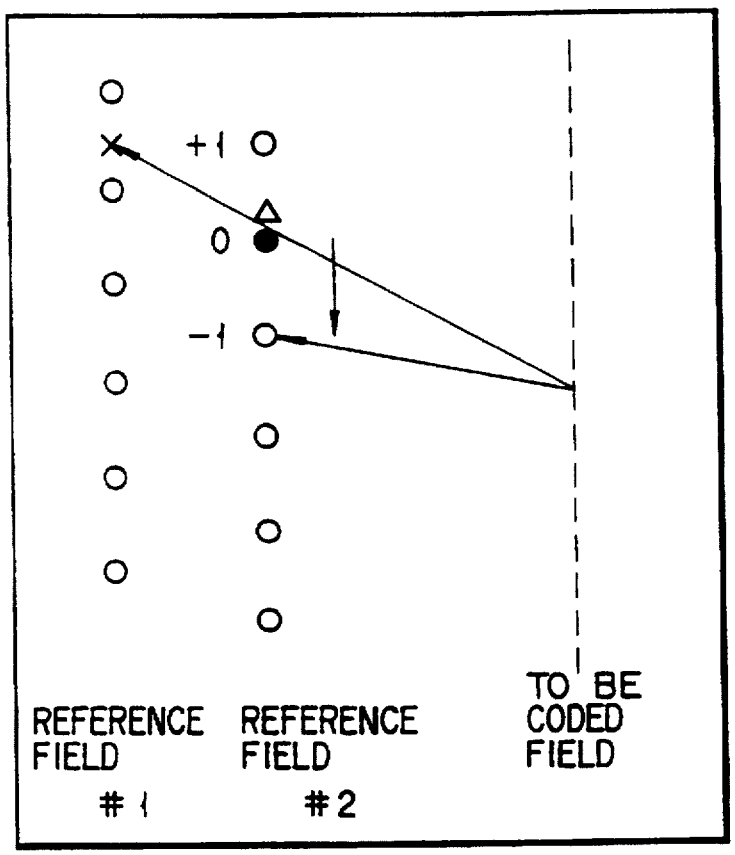
F I G. 26

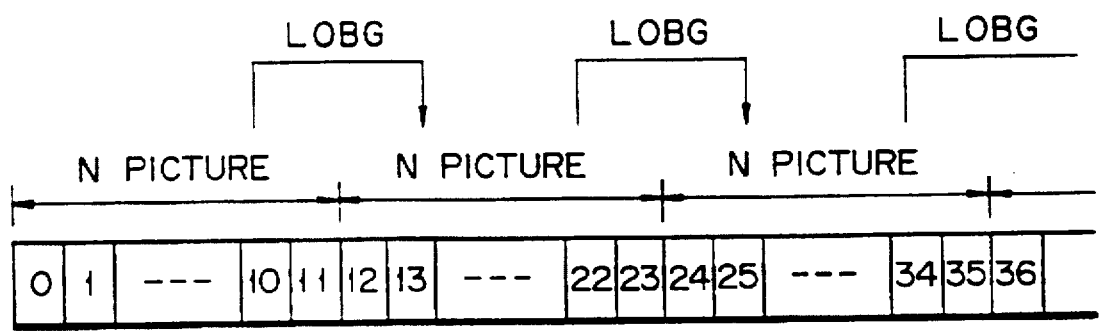
F I G. 30

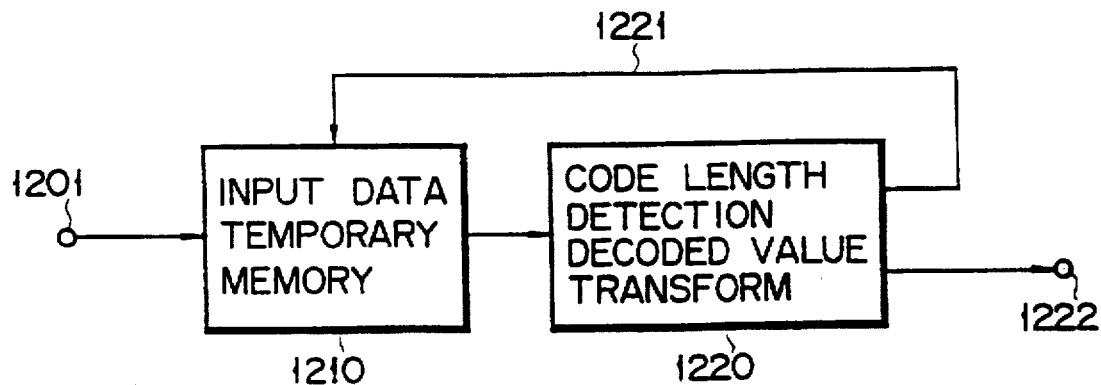
F I G. 34
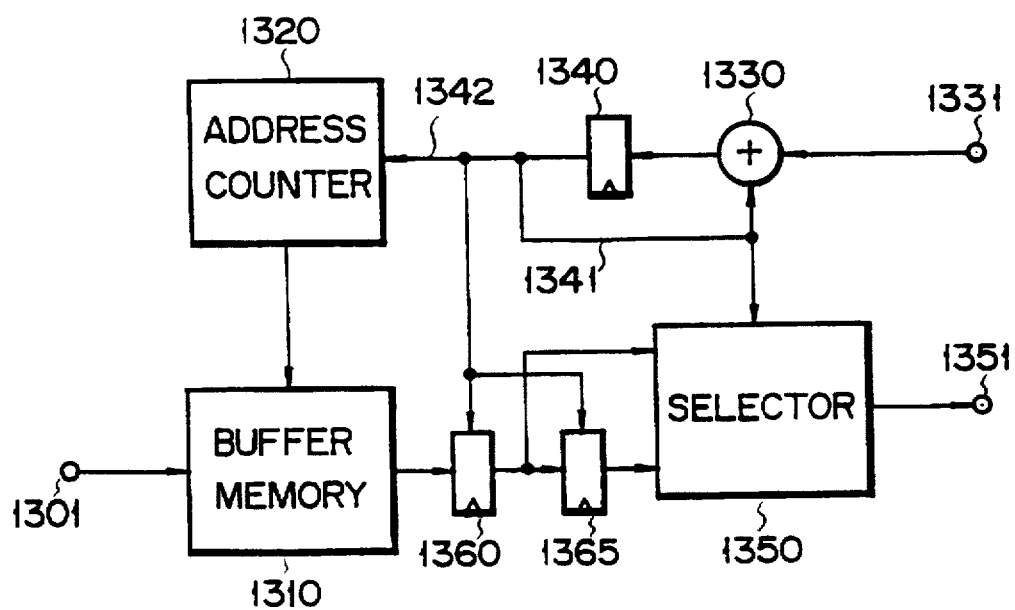
F I G. 35

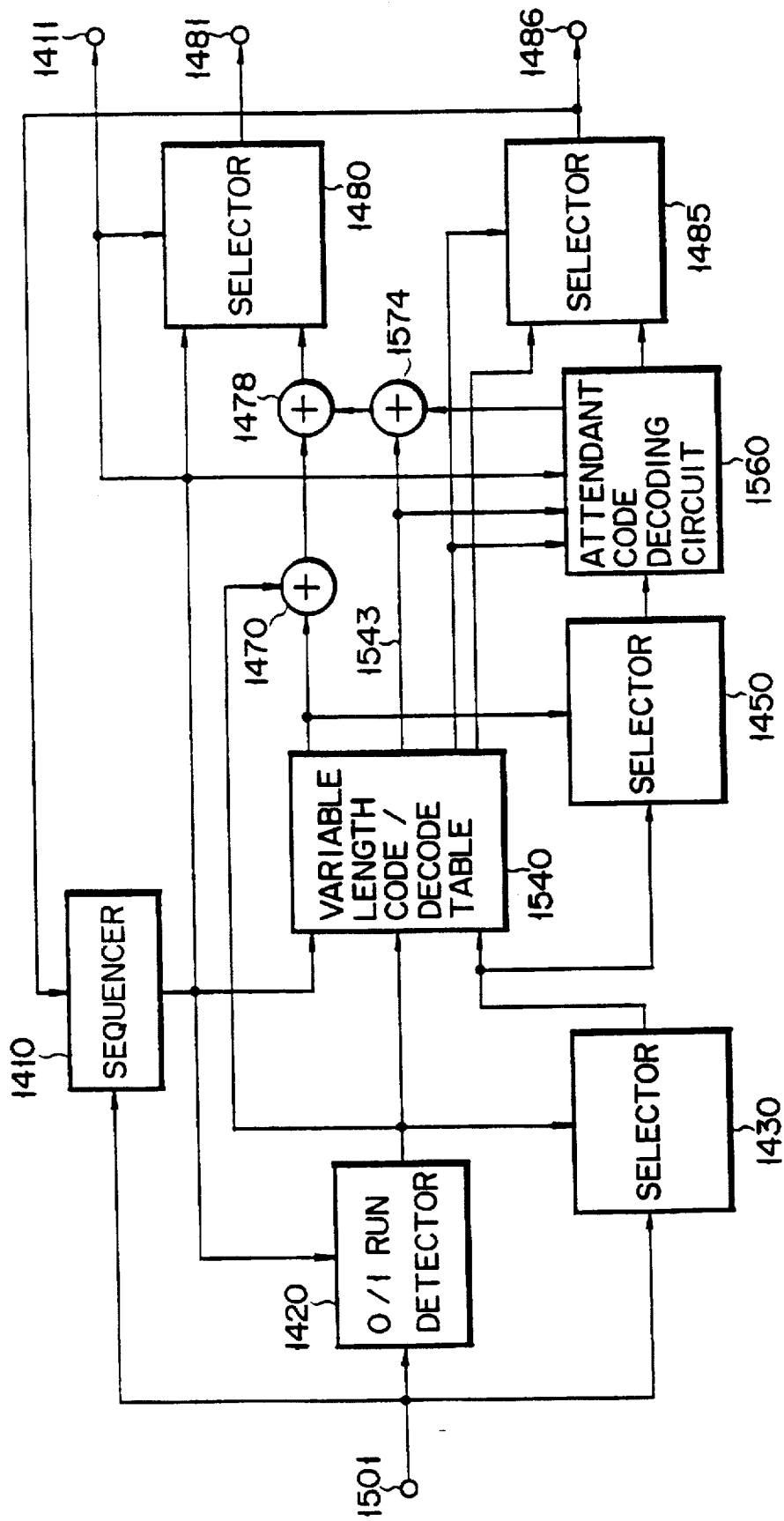
F I G. 37

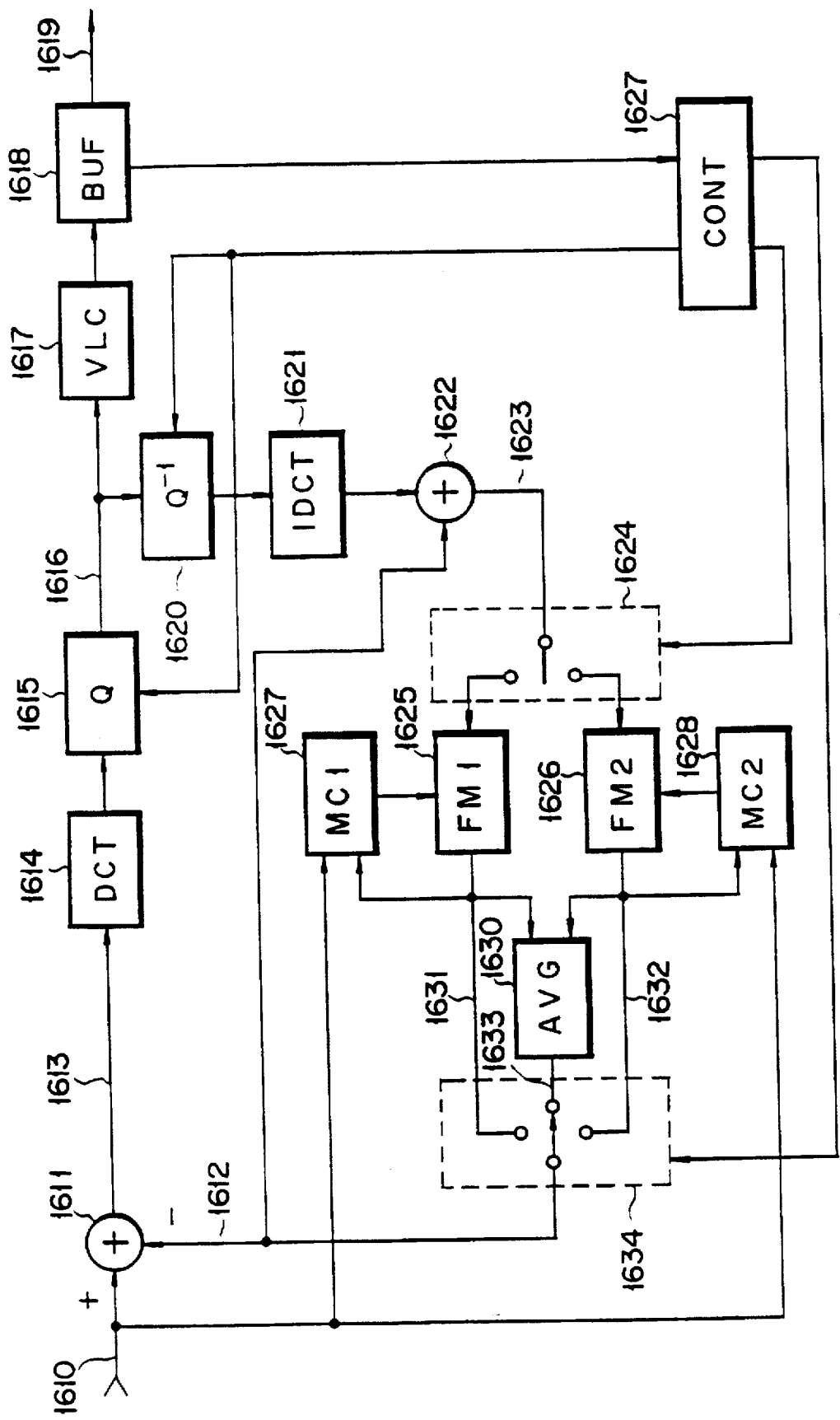
F I G. 38

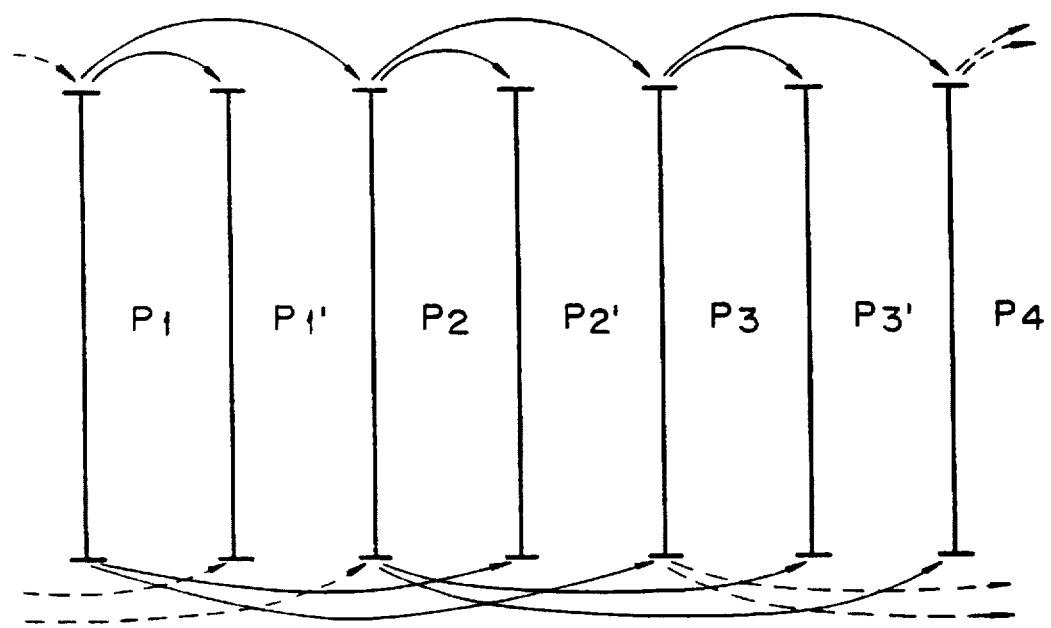
F I G. 39
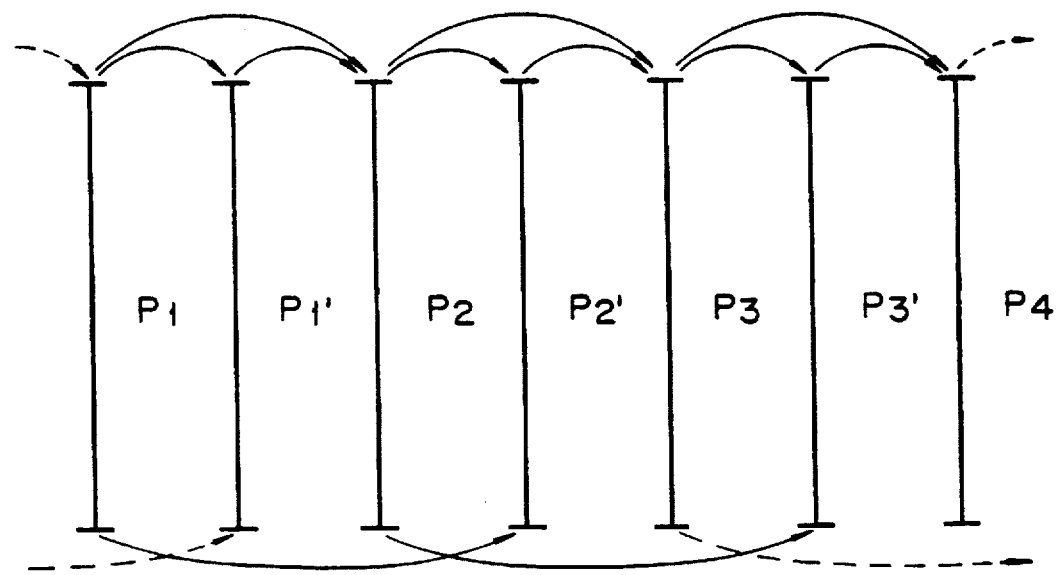
F I G. 40

MOTION COMPENSATED VIDEO DECODING METHOD AND SYSTEM FOR DECODING A CODED VIDEO SIGNAL USING SPATIAL AND TEMPORAL FILTERING

This is a Division of application Ser. No. 08/295,421 filed on Aug. 25, 1994, now U.S. Pat. No. 5,5,41,661, which is a continuation of application Ser. No. 08/156,709 filed on Nov. 24, 1993, now U.S. Pat. No. 5,424,779, which is a continuation of application Ser. No. 07/890,705 filed May 29, 1992, now U.S. Pat. No. 5,317,397.

BACKGROUND OF THE INVENTION

1. Field of the Invention

The present invention relates to an apparatus for coding a video signal in video communication, video transmission, video storing, and broadcasting and, more particularly, to a video coding apparatus using motion compensation predictive coding.

2. Description of the Related Art

A TV telephone, a TV meeting system, an optical disk apparatus, a VTR, a CATV, and the like require a technique for coding a video signal. As such a video coding scheme, so-called motion compensation prediction coding is known. In this scheme, a pixel value of a picture to be coded (to be referred to as a to-be-coded picture hereinafter) is predicted by using a pixel value of a coded picture designated by a motion vector, and a corresponding predictive error and the motion vector are coded.

Assume that such a motion compensation predictive coding scheme is applied to an interlaced video (field picture) signal. In this case, the scheme is not suitable for a motion precision higher than an intra-field ½ line, e.g., a higher precision than an intra-frame one line, because there is no corresponding pixel value in a reference picture.

For this reason, a method of performing motion compensation by interpolating a pixel value of a corresponding pixel which does not exist on a reference picture using the pictures of the two adjacent fields has been proposed (e.g., "Adaptive Line Interpolated Inter-field Motion Compensation Method", Image Coding Symposium, 1990, (PCSJ90), 8-1). In this motion compensation method, a to-be-coded picture is coded by using a reference picture and an optimum motion vector. The reference video signal is formed by interpolation using a signal, of coded video signals of past two fields, which is located at a position designated by a motion vector obtained by a motion vector searching circuit. More specifically, three field memories are prepared, and a signal obtained by performing intra-field interpolation using an output from the first field memory is mixed with an output from the second field memory at a mixing ratio of km:1-km. The value km varies depending on the motion magnitude detected by a motion magnitude detection circuit on the basis of outputs from the first and third field memories.

According to this conventional technique, an interpolation value is formed by using the video signals of two adjacent fields in accordance with the motion magnitude so that an appropriate reference video signal corresponding to a motion precision higher than an intra-field ½ line (a motion precision higher than an intra-frame 1 line) can be generated for a field picture, thereby allowing high-precision motion compensation predictive coding.

In this scheme, however, the motion between two reference pictures must be detected, as described above, and hence a motion magnitude detection circuit is required. In addition, in order to perform motion magnitude detection, the pictures of three adjacent fields must be coded before the detection. If the pictures of three adjacent fields are not coded before motion magnitude detection, the detection cannot be performed.

In a conventional video coding apparatus using the above-described motion compensation predictive coding scheme, when a search for a motion vector for motion compensation is performed in a forward or backward direction, a reference picture for searching for the motion vector is limited to one coded picture in a case that a to-be-coded picture is a non-interlaced video. For reasons of this, accurate motion compensation cannot be performed with respect to a video which moves between adjacent pictures in units of ½ pixels.

Of the above-described video coding schemes, a video coding scheme having a transmission rate of about 1 to 2 Mbps has been developed to be a standard, which is termed "MPEG1", for a picture storage such as VCRs and optical disks. This scheme is based on motion compensation inter-frame prediction and DCT (Discrete Cosine Transform).

A scheme for coding a video having high quality equal to or higher than quality for TV broadcasting at about 2 to 10 Mbps has been studied for the same purpose as described above. A coding scheme of MPEG1 is designed to be applied to a non-interlaced video as input signals. However, since the standard TV signal is interlaced video, where the coding scheme MPEG1 is applied to the interlaced video, a new means suitable for interlaced video is required. An inter-field/inter-frame adaptive prediction scheme is known as a coding method of interlaced video. In this scheme, a field having the same scan phase as that of a coding (to-be-coded) field (an odd field when an odd field is coded and vice versa), and a field having a scan phase different from that of the coding (to-be-coded) field and close in time thereto (e.g., an even field when an odd field is coded and vice versa) are switched as a prediction signal. In addition, interpolation prediction has recently been studied, which forms prediction signals by averaging signals extracted from current and previous fields (e.g., F. Wang et al., "High-quality coding of the even fields based on the odd fields of interlaced video sequences", IEEE trans. CS).

When an interlaced video is subjected to a predictive coding using current and previous fields as in the coding scheme MPEG1, the even and odd fields suitable for the interlaced video is applied to a prediction. In this case, since the amount of motion vector information is increased when motion vectors are sent for the respective fields, means for decreasing the amount of motion vector information without a decrease in efficiency is required. That is, it is required to improve the prediction precision with respect to an interlaced video and decrease the information amount of predictive error coded outputs. In addition, it is required to minimize an increase in motion vector information. However, no effective techniques capable of satisfying such requirements have been proposed yet.

As described above, in the conventional technique, in order to interpolate between the pixels on a reference picture using two field pictures adjacent to the reference picture, motion magnitude detection is required for the reference picture. Therefore, a motion magnitude detection circuit is required, and the hardware inevitably becomes complicated. In addition, if three adjacent fields are not coded before motion magnitude detection, the detection cannot be performed.

Furthermore, according to the conventional technique, since a reference picture is limited to one coded picture in a search for a motion vector, accurate motion compensation cannot be performed with respect to a video which moves between pictures in units of ½ pixels. Further, if a prediction signal is formed referring to plural frames, since a large amount of arithmetic operation is required to search for a motion vector, the motion vector search time is prolonged or the circuit size of the hardware is increased.

Moreover, in the conventional technique, the prediction precision with respect to an interlaced video cannot be effectively improved, and the amount of motion vector information sent for the respective fields is undesirably increased.

SUMMARY OF THE INVENTION

It is an object of the present invention to provide a video coding apparatus which predicts one field from the other field within one frame.

It is another object of the present invention to provide a video coding apparatus which searches for a region adjacent to the partial pictures which are to be coded from among a plurality of coded frames, and obtains prediction signals by performing spatial-temporal filtering of the pictures.

It is another object of the present invention to provide a video coding apparatus which obtains a prediction signal by limiting the searching range of motion vectors.

It is another object of the present invention to provide a video coding apparatus which forms different prediction values in accordance with the values of motion vectors.

According to the present invention, there is provided a video coding apparatus comprising:

- a memory for storing a coded video signal used for prediction as a reference video signal;
- a motion vector detecting circuit for detecting, using from one field picture signal read out from the memory, a motion vector regarding the other field picture signal to be coded, a pair of the one field picture signal and the other field picture signal forming a frame video signal;
- a prediction signal producing circuit for producing a prediction signal based on a reference video signal designated by the motion vector detected by the motion vector detecting circuit; and
- a coding circuit for coding a difference between the prediction signal and a video signal corresponding to the other field picture signal to be coded.

According to the present invention, there is provided a video coding apparatus comprising:

- a memory for storing a coded video signal used as a reference video signal;
- a vector detecting circuit for detecting, from plural field picture signals or plural frame picture signals which are read out from the memory and the reference picture signals, an optimum motion regarding a picture signal to be coded;
- a prediction signal producing circuit for subjecting a spatial-temporal filtering to a reference picture signal designated by the optimum motion vector to produce a prediction signal; and
- a coding circuit for coding the picture signal to be coded on the basis of the prediction signal.

According to the present invention, there is provided a video coding apparatus comprising:

- a memory for storing a coded video signal used as a reference video signal;
- a motion vector detecting circuit for detecting, from a picture read out from the memory, a motion vector regarding the to-be-coded picture signal;
- a searching range limiting circuit for limiting a range of the reference picture which the motion vector detecting means searches for in a motion vector detection;
- a prediction signal producing circuit for producing a prediction signal based on the reference video signal designated by the motion vector detected by the motion vector detecting circuit; and
- a coding circuit for coding the video signal on the basis of the motion vector and the prediction signal.

According to the invention there is provided a video coding apparatus comprising:

- a memory for storing a coded video signal used as a reference picture signal;
- a motion vector candidate generating circuit for generating plural motion vector candidates for designating plural partial pictures of a plurality of reference pictures read out from the memory;
- a prediction signal candidate producing circuit for subjecting a filtering processing corresponding to a type of each of the motion vector candidates output from the motion vector candidate generating circuit to each of the partial pictures to produce a plurality of prediction signal candidates;
- a motion vector detecting circuit for selecting an optimum prediction signal among the prediction signal candidates which is most optimum to the to-be-coded picture, and outputting the optimum prediction signal and an optimum motion vector corresponding thereto; and
- a coding circuit for coding the to-be-coded picture signal on the basis of a difference between the to-be-coded picture signal and the optimum prediction signal and the optimum motion vector.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a block diagram of a video coding apparatus in accordance with the second embodiment of the present invention;

FIG. 7 is a block diagram of a video coding apparatus in accordance with the third embodiment of the present invention;

FIG. 8 is a block diagram of a video coding apparatus in accordance with the fourth embodiment of the present invention;

FIG. 10 is a block diagram of a video decoder;

FIG. 11 is a view showing a motion vector searching operation according to the present invention;

FIG. 12 is a view showing a motion vector searching operation according to the present invention;

FIG. 13 is a view showing a motion vector searching operation according to the present invention;

FIG. 14 is a view showing a motion vector searching operation according to the present invention;

FIG. 15 is a view showing a motion vector searching operation according to the present invention;

FIG. 16 is a view showing a motion vector searching operation according to the present invention;

FIGS. 20A and 20B illustrate the arrangement of a group of pictures and a coding sequence in the sixth embodiment, respectively;

FIGS. 21A and 21B are views for explaining prediction methods for the respective pictures in the sixth embodiment;

FIG. 22 is a block diagram showing a video decoding apparatus corresponding to the video coding apparatus in FIG. 17;

FIGS. 25A and 25B are views for explaining inter-field/inter-frame adaptive prediction processing in the sixth embodiment;

FIG. 26 is a view showing a manner of transmitting motion vectors in the sixth embodiment;

FIG. 30 is a view showing allocation of amounts of bits to N pictures in the sixth embodiment;

FIG. 34 is a block diagram showing a variable length code decoder according to an embodiment of the present invention;

FIG. 35 is a block diagram showing an arrangement of an input data temporary storage circuit in FIG. 34;

FIG. 37 is a block diagram showing another arrangement of a code length detection/decoded value transform circuit;

FIG. 38 is a block diagram showing a video coding apparatus according to another embodiment of the present invention;

FIG. 39 is a view showing the relationship between to-be-coded pictures and reference pictures to explain a video coding method according to the present invention; and FIG. 40 is a view showing the relationship between to-be-coded pictures and reference pictures to explain another video coding method according to the present invention.

DETAILED DESCRIPTION OF THE PREFERRED EMBODIMENTS

Figure 1:
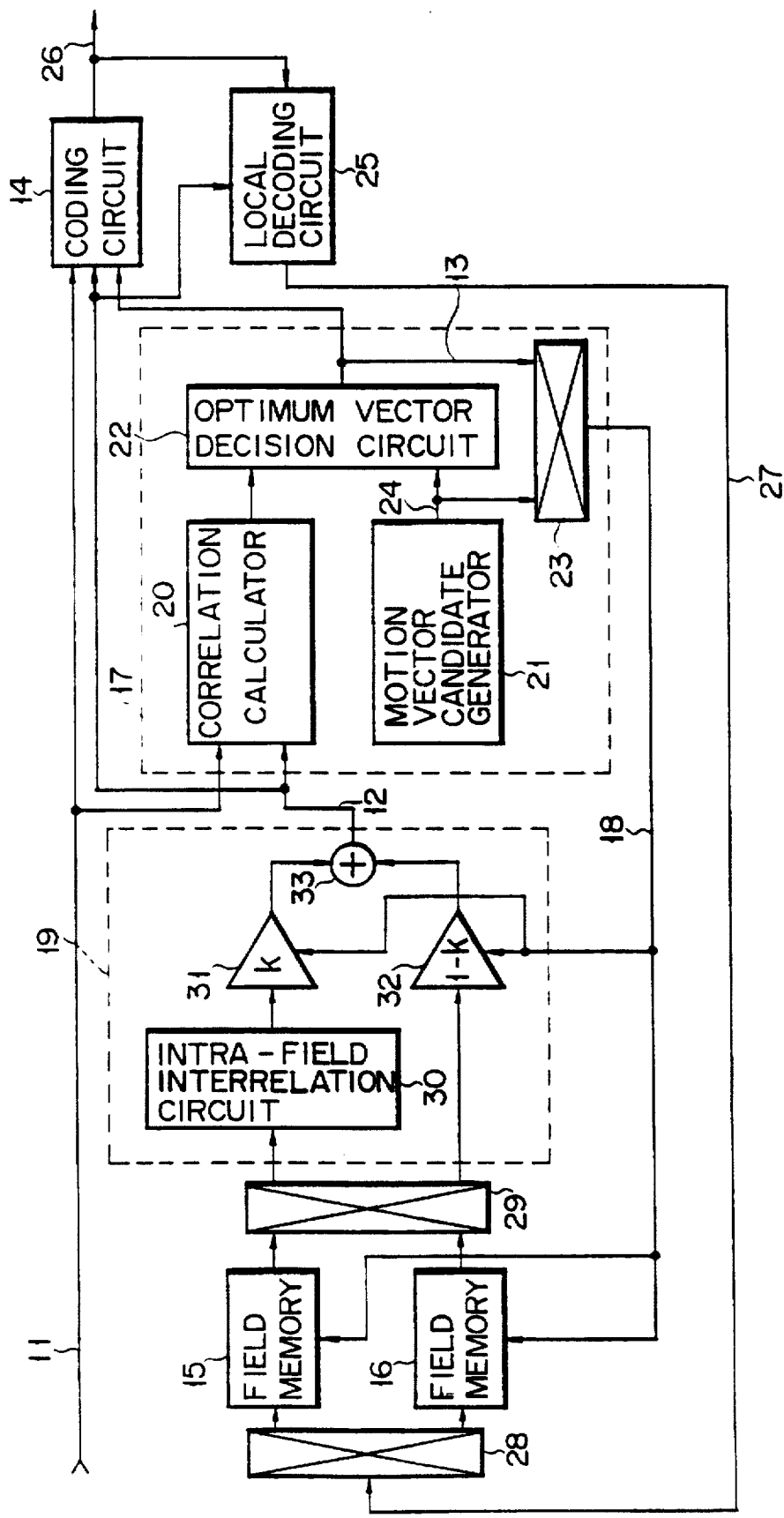
FIG. 1 is a block diagram of a video coding apparatus in accordance with the first embodiment of the present invention.

According to an embodiment of the present invention shown in FIG. 1, a video coding apparatus comprises a coding circuit 14 for coding a video signal, two field memories 15 and 16 for storing the coded video signals of past two fields, a motion vector searching circuit 17, an interpolation circuit 19, and a local decoding circuit 25.

A to-be-coded video signal 11 is coded by the coding circuit 14 by using a reference video signal 12 output from the interpolation circuit 19 and an optimum motion vector 13 output from the motion vector searching circuit 17. The reference video signal 12 is formed by the interpolation circuit 19 using a video signal, of the coded video signals of past two fields stored in the field memories 15 and 16, which is located at a position designated by a motion vector candidate 18 output from the motion vector searching circuit 17.

The motion vector searching circuit 17 is constituted by a correlation arithmetic operation circuit 20, a motion vector candidate generating circuit 21, an optimum vector decision circuit 22, and a switch circuit 23. During a motion vector searching operation, motion vector candidates 24 sequentially generated by the motion vector candidate generating circuit 21 are input to the field memories 15 and 16 through the switch circuit 23, and a correlation arithmetic operation between the reference video signal 12 generated by the interpolation circuit 19 and the to-be-coded video signal 11 is performed by the correlation arithmetic operation circuit 20 on the basis of these motion vector candidates. The optimum vector decision circuit 22 stores a motion vector at which the correlation between the to-be-coded video signal 11 and the reference video signal 12 is maximized, and outputs the optimum motion vector 13 to the coding circuit 14 and the switch circuit 23 upon completion of the motion vector searching operation. The to-be-coded video signal 11 is coded by the coding circuit 14 in accordance with this optimum motion vector 13 and the optimum reference video signal 12 from the interpolation circuit 19. As a result, coded data 26 is output from the coding circuit 14.

The local decoding circuit 25 forms a local decoded video signal 27 on the basis of the optimum reference video signal 12 output from the interpolation circuit 19 and the coded data 26 output from the coding circuit 14. The local decoded video signal 27 is input to either the field memory 15 or the field memory 16 through a switch circuit 28. The output from the field memory 15 or 16 is input to the interpolation circuit 19 through a switch circuit 29. In this case, the switch circuits 28 and 29 are switched such that two video signals for forming a predetermined reference picture for a to-be-coded video are input to the interpolation circuit 19.

The interpolation circuit 19 comprises an intrafield interpolation circuit 30, multipliers 31 and 32, and an adder 33. The interpolation circuit 19 forms the reference video signal 12 by mixing a signal, formed by the intra-field interpolation circuit 30 using an output signal from the field memory 15, with an output signal from the field memory 16 at a mixing ratio of k:1-k.

The motion vector candidate 18 output from the motion vector searching circuit 17 is also input to the interpolation circuit 19 to control a parameter k for determining the mixture ratio between output signals from the field memories 15 and 16. More specifically, if the vertical component of the motion vector candidate 18 corresponds to intra-field n+½ lines (n is an integer), control is performed to set k=1 so that a corresponding pixel value stored in the field memory 15 (in this case, it is assumed that a video close to a to-be-coded video is stored in the field memory 15) is directly output as the reference video signal 12.

Figure 2:
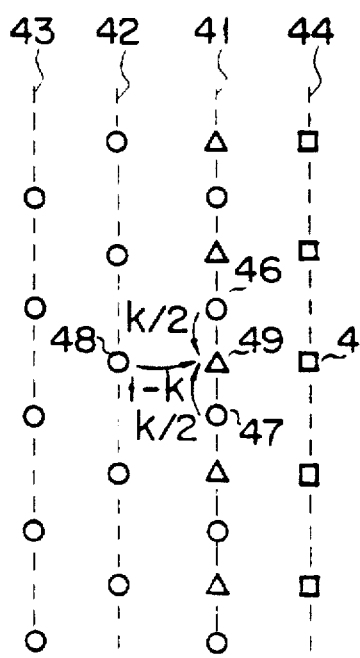
FIG. 2 to 4 are views each showing the relationship between video signals of the respective frames according to the first embodiment.

If the vertical component of the motion vector candidate 18 corresponds to intra-field n lines, an interpolation value (Δ) for the video signal of an adjacent field is formed by using output signals from the field memories 15 and 16. More specifically, as shown in FIG. 2, an interpolation value (Δ) 49 serving as a reference video signal for a pixel value 45 in a to-be-coded video signal 44 is the sum of a value, obtained by multiplying the average value of pixel values 46 and 47 formed by intra-field interpolation by k, and a value obtained by multiplying a pixel value 48 by (1-k). If the absolute value of the vertical component of the motion vector candidate 18 is larger than a certain threshold value, it is considered that the motion of the reference picture is also large. In this case, since it is proper that the interpolation value (Δ) is interpolated by mainly using a signal adjacent to the interpolation value (Δ) of the same field stored in the field memory 15, the parameter k is increased. In contrast to this, if the absolute value of the vertical component of the motion vector candidate 18 is smaller than the threshold value, it is considered that the motion of the reference picture is also small. In this case, since it is proper that the interpolation value (Δ) is interpolated by mainly using a signal adjacent to the interpolation value (Δ) in the field memory 16, the parameter k is decreased.

Figure 4:
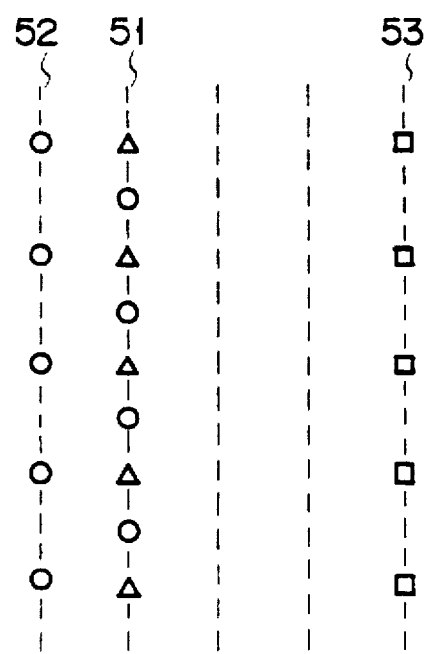
Figure 3:
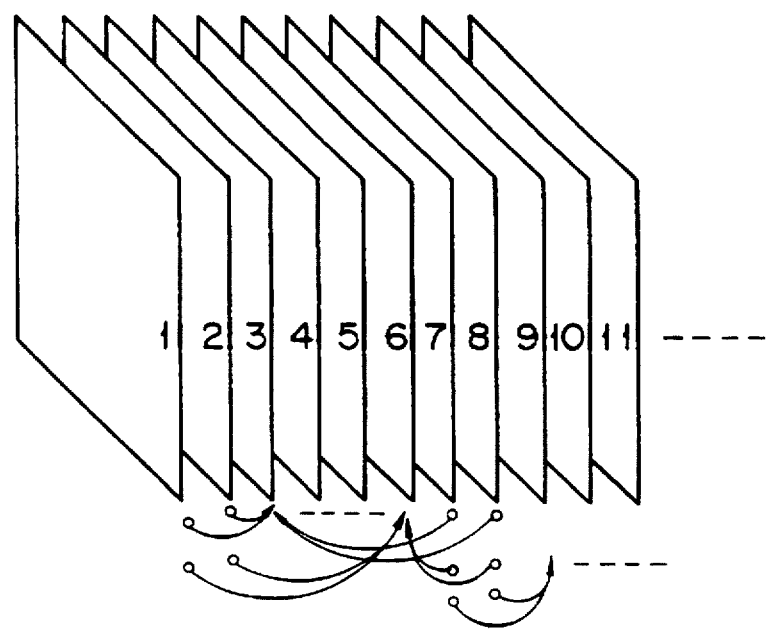

Note that if the to-be-coded picture 44 is adjacent to a reference picture 41, as shown in FIG. 2, the effective use of a signal from the field memory 16, obtained by decreasing the parameter k to a value close to "0", as an interpolation value for the reference picture 41 is almost limited to the case wherein the absolute value of the vertical component of the motion vector candidate 18 is "0". In contrast to this, when two adjacent fields (fields 1, 2, 7, and 8 in FIG. 3) are to be coded in advance in the coding sequence shown in FIG. 3, i.e., at intervals of a plurality fields (six fields in FIG. 3), and the remaining four fields (fields 3 to 6 in FIG. 3) are to be subjected to prediction coding for motion compensation by using the two adjacent coded fields, a to-be-coded picture 53 and a reference picture 51 may be relatively spaced apart from each other, as shown in FIG. 4. In such a case, a signal from the field memory 16, obtained by decreasing the parameter k to a value close to "0", can be effectively used as an interpolation value for the reference picture 51 even if the absolute value of the vertical component of the motion vector is not "0".

The second embodiment of the present invention will be described below with reference to FIG. 5. Since this embodiment is the same as the one shown in FIG. 1 except for the arrangement of an interpolation circuit 19, a detailed description thereof will be omitted.

The interpolation circuit 19 is constituted by two interpolators 34 and 35 and a switch circuit 36 for selecting one of outputs from the interpolators 34 and 35. Each of the interpolators 34 and 35 comprises an inter-field interpolation circuit 30, multipliers 31 and 32, and an adder 33, similar to the interpolation circuit 19 shown in FIG. 1.

Figure 6A:
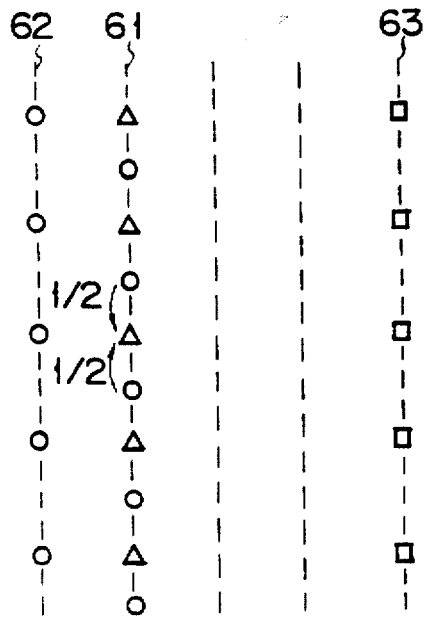
FIGS. 6A and 6B are views each showing the relationship between the video signals of the respective frames according to the second embodiment.
Figure 6B:
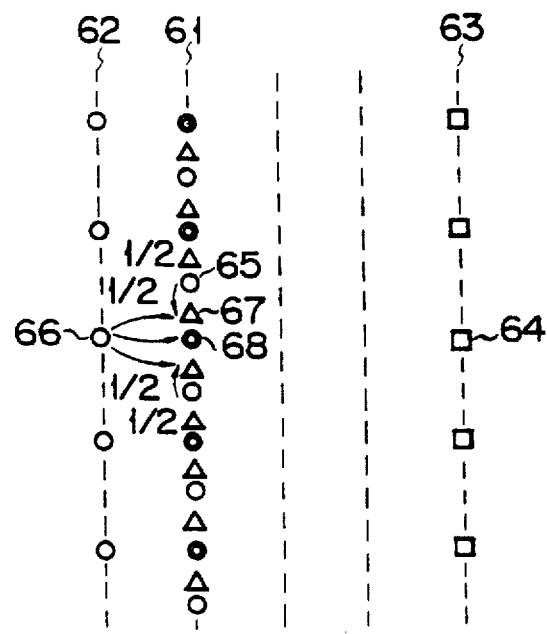

The relationship between a plurality of video signals in the embodiment shown in FIG. 5 will be described below with reference to FIGS. 6A and 6B.

The first interpolator 34 generates an interpolation value which is effective when the motion magnitude of a reference picture 61 is large. That is, as shown in FIG. 6A, when the vertical component of a motion vector candidate 18 corresponds to intra-field n+½ lines (n is an integer), a corresponding pixel value ○ stored in a field memory 15 (in this case, it is assumed that a picture close to a to-be-coded picture 63 is stored in the field memory 15) is directly output as a reference video signal (control is performed to set k=1).

When the vertical component of the motion vector candidate 18 corresponds to intra-field n lines (n is an integer), the first interpolator 34 forms an interpolation value Δ on the basis of the average value of two pixel values o of the video signal 61 in the field memory 15 which are adjacent to a pixel Δ to be interpolated.

The second interpolator 35 generates an interpolation value which is effective when the motion magnitude of the reference picture 61 is small. That is, as shown in FIG. 6B, when the vertical component of the motion vector candidate 18 corresponds to intra-field n+½ lines (n is an integer), a corresponding pixel value ○ stored in the field memory 15 (in this case, it is assumed that a picture close to the to-be-coded picture 63 is stored in the field memory 15) is directly output as a reference video signal (control is performed to set k=1). If, for example, n=0, a reference video signal corresponding to a to-be-coded video signal 64 corresponds to a pixel value 65.

In addition, when the vertical component of the motion vector candidate 18 corresponds to intra-field n lines, the second interpolator 35 sets an adjacent signal ○ in a field memory 16 as a pixel value ⊙ to be interpolated. If, for example, n=0, an interpolation value 68 of a reference video signal for the to-be-coded video signal 64 corresponds to a pixel value 66.

If the vertical component of the motion vector candidate 18 corresponds to intra-field n/2+¼ lines, an interpolation value Δ is formed on the basis of the average value of pixel values ○ from the field memories 15 and 16 which are adjacent to a pixel Δ to be interpolated. For example, if n=0, an interpolation value 67 of a reference video signal for the to-be-coded video signal 64 corresponds to the average value of the pixel values 65 and 66.

In this manner, the interpolator 35 can generate reference video signals in units of intra-field ¼ lines to realize effective motion compensation for a high-resolution picture having a small motion magnitude.

In this case, the switch circuit 36 selects an output from the interpolator 34 when the absolute value of the vertical component of the motion vector candidate 18 output from a motion vector searching circuit 17 is larger than a certain threshold value. When this value is smaller than the threshold value, the switch circuit 36 selects an output from the interpolator 35. With this operation, proper reference video signals are output. According to another switching method, when the absolute value of the vertical component of the motion vector candidate 18 output from the motion vector searching circuit 17 is large, an output from the interpolator 34 is selected, whereas when the value is small, outputs from both the interpolators 34 and 35 are used as reference video signals, and a correlation arithmetic operation between the two signals is performed to select one of the outputs. This method is also effective.

A video coding apparatus according to the third embodiment of the present invention will be described below.

Referring to FIG. 7, picture data input to an input terminal 001 is temporarily stored in an input buffer memory 100. The data is then read out, as partial picture data, from the input buffer memory 100 in units of partial regions, each constituted by a plurality of pixels, in the order of to-be-coded pictures. Partial picture data read out from the input buffer memory 100 is input to a motion vector detection circuit 200. The motion vector detection circuit 200 obtains a partial picture, from pictures coded and reproduced in the past, which can efficiently code the input data, and outputs a motion vector (address data) indicating the region data and position of the partial picture.

The partial picture data output from the input buffer memory 100 is also input to a local coding circuit 300 together with the partial picture data and the motion vector output from the motion vector detection circuit 200. The local coding circuit 300 codes either the partial picture data output from the input buffer memory 100 or difference data relative to the partial picture data designated by the motion vector. In this case, the coded data corresponding to the difference relative to the region designated by the motion vector includes data obtained by variable length coding of the motion vector.

The data coded by the local coding circuit 300 is input to a local decoding circuit 400 to be decoded together with the partial picture data output from the motion vector detection circuit 200. With this operation, a reproduced picture is obtained. In addition, if the data is coded by using a motion vector, the decoded data is added to the partial picture data output from the motion vector detection circuit 200 to obtain a reproduced picture. This reproduced picture data is input to the motion vector detection circuit 200 and is temporarily stored to code the next input picture data.

Operations of the motion vector detection circuit 200, the local coding circuit 300, and the local decoding circuit 400 will be described in detail below.

In the motion vector detection circuit 200, data input from the input buffer memory 100 are sequentially written in picture memories (211 to 214), in which picture data unnecessary to search for motion vectors are stored, under the control of a write control circuit 222. In this manner, coded picture data stored in the picture memories (211 to 214) are sequentially read out in units of regions, starting from a picture close in time to the coded picture, by a read control circuit 221 and a data switching circuit 231. The data are then input to a difference circuit 241. The difference circuit 241 calculates the differences between the coded picture data and input data in units of regions.

An estimation circuit 242 sequentially compares the sums of differences in units of regions to control the searching direction of the read control circuit 221 in the picture memories. Every time a partial region of a coded picture which is less different from the input partial picture than the previously detected partial picture is detected, the estimation circuit 242 causes a vector register 243 to store address data indicating this region of the partial picture, thus obtaining a partial region of the coded picture which is closest to the input partial picture. In this manner, the address data indicating the partial region of the coded picture which is least different from the input partial picture stored in the vector register 243 is input to a read control circuit 223 and a switch circuit 232. As a result, the reproduced picture of coded data corresponding to the partial region of the coded picture is read out from one of reproduced picture memories (215 to 218), and is input to the local coding circuit 300 together with its address data.

According to this embodiment, in the local coding circuit 300, DCT (discrete cosine transformation) as one of orthogonal transformation schemes, quantization, and variable length coding are used as a coding method for a motion compensation error. In the local coding circuit 300, partial picture data output from the input buffer memory 100 is input to a difference circuit 311 so that the difference between the partial picture data and partial picture data obtained by reproducing coded data output from the motion vector detection circuit 200 is calculated. A switch circuit 312 sequentially switches and outputs difference picture data input from the difference circuit 311 and partial picture data input from the input buffer memory 100 in accordance with control signals input to a terminal 002.

A DCT circuit 320 sequentially frequency-converts partial data and difference picture data sequentially output from the switch circuit 312, and outputs the resultant data. A quantizer 330 quantizes the frequency-converted data output from the DCT circuit 320 with a preset quantization step size, and outputs the resultant data. An entropy coder 340 codes the quantized data together with its quantization step size information and identification data indicating whether the data is partial picture data or difference data. In addition, in coding of difference picture data, the entropy coder 340 performs variable length coding of the data together with a motion vector corresponding to the partial picture data output from the vector register 243 by using Huffman codes or the like in accordance with the respective occurrence probabilities. If this identification code and the motion vector code are combined to form one Huffman code, efficient coding can be realized. Furthermore, in this coding, with regard to picture data obtained by reproducing coded data in a region designated by a predetermined rule, or input picture data which differs from fixed data by a predetermined value or less, if the number of such successive partial pictures is coded by variable length coding, the coding efficiency is further improved.

An amount-of-bits estimation circuit 351 compares the amount of bits of coded data, obtained by coding the difference between a partial picture to be coded and a picture in a region designated by a motion vector, with that of coded data obtained by directly coding input data by DCT, and outputs coded data with higher coding efficiency to an output buffer 360 and the local decoding circuit 400.

The output buffer 360 temporarily stores this coded data for adjustment of the output data rate, and controls a quantization step size used by the quantizer 330 and a coding table used by the entropy coder 340.

In the local decoding circuit 400, the partial picture data output from the motion vector detection circuit 200 is temporarily stored in a data memory 441, and the coded data output from the amount-of-bits estimation circuit 351 is input to a variable length decoder 410, so that the motion vector including the identification code and the quantized data before coding are decoded. This decoded quantized data is input to an inverse quantizer 420 to be converted (inversely quantized) into a typical value having a dynamic range before quantization. The converted value is input to an adder 450. The data inversely quantized by the inverse quantizer 420 is input to an inverse DCT circuit 430 so that the partial picture or the difference picture data is reproduced. A gate circuit 442 permits the passage of the partial picture data output from the data memory 441 if it is determined on the basis of the identification code decoded by the variable length decoder 410 that the reproduced data output from the inverse DCT circuit 430 is difference picture data. Otherwise, the gate circuit 442 sets the output data to be "0". The gate circuit 442 outputs the resultant data to the adder 450.

If the picture data subjected to inverse DCT in this manner corresponds to a coded difference picture, the data is added to the partial picture data output from the motion vector detection circuit 200. Otherwise, a reproduced picture is obtained by the adder 450 without using the partial picture data output from the motion vector detection circuit 200. This reproduced picture data is input to the motion vector detection circuit 200 to be temporarily stored so as to be used for coding the next input picture data.

FIG. 8 shows the fourth embodiment of the present invention. This embodiment is different from the previous embodiment in that a data memory 460 for storing quantized data is used in place of the variable length decoder 410 included in the decoding circuit 400 shown in FIG. 7. In this case, data obtained by performing DCT and quantization of difference picture data based on the difference between the partial picture data output from an input buffer memory 100 and partial picture designated by a corresponding motion vector are temporarily stored in the data memory 460. Thereafter, picture data corresponding to coded data selected by a amount-of-bits estimation circuit 352 and output from an output buffer 360 is output to an inverse quantizer 420. If this picture data is difference picture data, the data is added to partial picture data output from a data memory 441 by an adder 450 to obtain a reproduced picture, as in the embodiment shown in FIG. 7.

In this embodiment, since no arithmetic operation is required for decoding, the processing time is shorter than that in the embodiment shown in FIG. 7.

Figure 9:
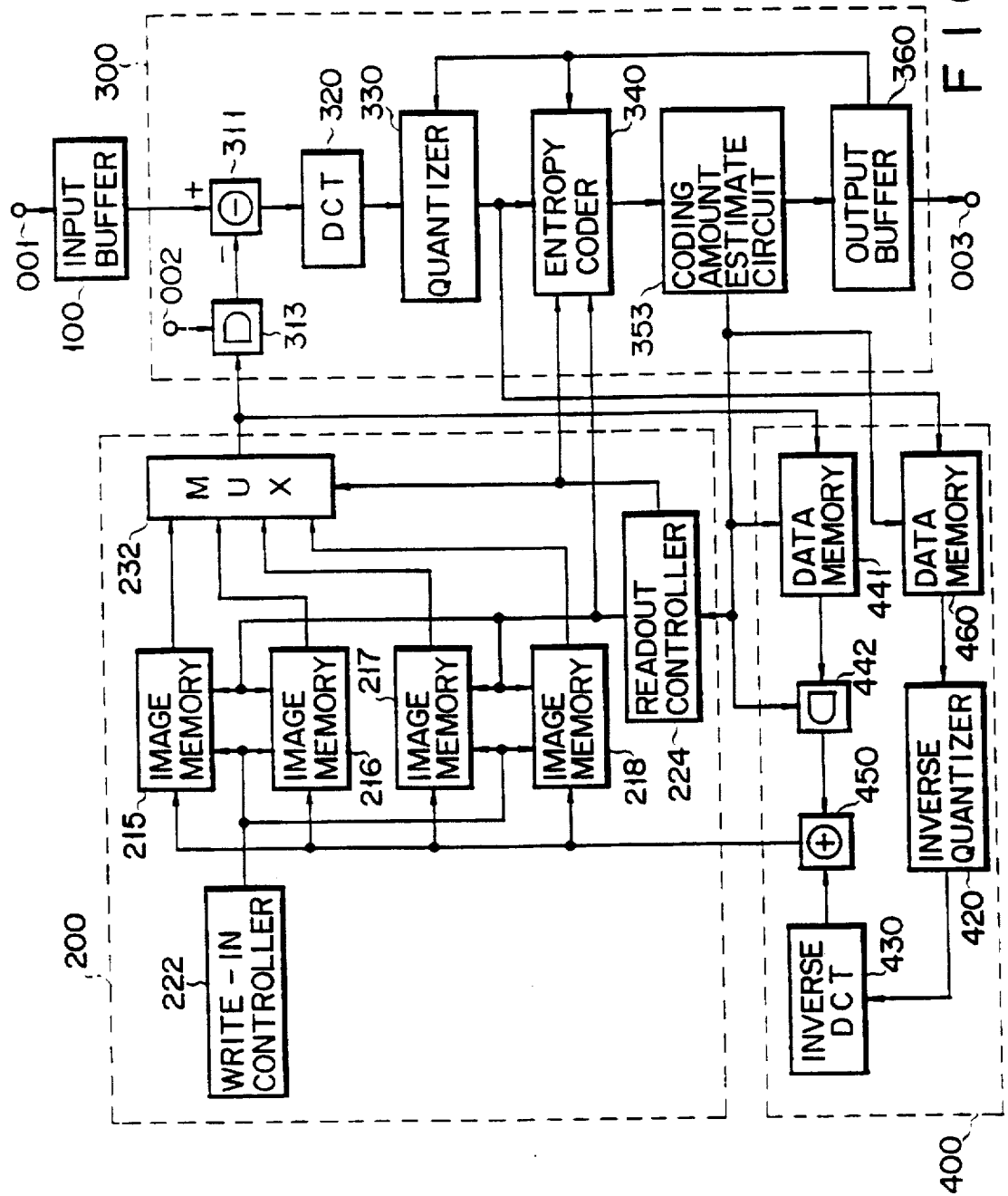
FIG. 9 is a block diagram of a video coding apparatus in accordance with the fifth embodiment of the present invention.

FIG. 9 shows the fifth embodiment of the present invention, in which part of a decoding circuit 400 is used as a motion vector detection circuit. Similar to the above-described embodiments, in this embodiment, a motion vector detection circuit 200 reads out partial picture data of decoded and reproduced picture data through a switch circuit 232 under the control of a read control circuit 224, and outputs a motion vector (address data) indicating the position of the corresponding region.

Referring to FIG. 9, similar to the embodiments shown in FIGS. 7 and 8, picture data input to an input terminal 001 are temporarily stored in an input buffer memory 100. The data are then read out from the input buffer 100 in units of regions, each consisting of a plurality of pixels, in the order of to-be-coded pictures, and are input to a local coding circuit 300. In response to a control signal input to an input terminal 002, DCT, quantization, and coding of partial picture data output from the input buffer memory 100 are performed without calculating the difference between the partial picture data and output data from the motion vector detection circuit 200, which is input through a gate circuit 313, in the same manner as in the embodiments shown in FIGS. 7 and 8. The quantized data is stored in a data memory 460, and the coded data and the amount-of-bits data are stored in an amount-of-bits estimation circuit 353. Subsequently, a different control signal is input to the input terminal 002 to calculate the difference between the partial picture output from the input buffer memory 100 and the partial picture data output from the motion vector detection circuit 200, and DCT, quantization, and variable length coding of the difference data are performed in the same manner as in the embodiments shown in FIGS. 7 and 8.

The amount-of-bits estimation circuit 353 estimates coded data from an entropy coder 340 and controls the read control circuit 224 in accordance with the estimation result. With this operation, every time the amount-of-bits estimation circuit 353 detects a region in which the amount of bits can be further reduced, the circuit 353 causes the read control circuit 224 to store corresponding coded data. In addition, the circuit 353 causes a data memory 441 to store partial picture data output from the motion vector detection circuit 200, and causes the data memory 460 to store data obtained by performing DCT and quantization of a corresponding difference picture. In this manner, coded data having the minimum amount of bits is finally output to an output buffer 360. Quantized data corresponding to this coded data is reproduced by the local decoding circuit 400 in the same manner as in the embodiments shown in FIGS. 7 and 8. The reproduced data is input to the motion vector detection circuit 200 to be temporarily stored so as to be used for coding the next input picture data.

In the embodiments shown in FIGS. 7 and 8, a more accurate motion vector is obtained as an optimum motion vector. In contrast to this, in the embodiment shown in FIG. 9, a motion vector realizing the maximum coding efficiency is obtained.

FIG. 10 shows a reproduction circuit for reproducing coded data in the embodiments shown in FIGS. 7 to 9. In this circuit, a variable length decoder 510 decodes coded data input from an input terminal 004 to reproduce quantization step size information, motion vector data (including an identification code indicating whether the reproduced data is difference picture data relative to a partial picture designated by the motion vector), and quantized data. The quantized data is reproduced through an inverse quantizer 520 and an inverse DCT circuit 530. If this reproduced data is difference picture data relative to the partial picture designated by the motion vector, a read control circuit 621 reads out the corresponding partial picture data from one of reproduced picture memories 611 to 614, outputs the data from a motion vector detection circuit 600, and inputs it to a local decoding circuit 500. This partial picture data is added to the difference picture data by an adder 550 through a gate circuit 540 to form reproduced picture data. The reproduced picture data is input to the motion vector detection circuit 600 to be temporarily stored so as to be used for reproduction of the next input coded data. In addition, the reproduced picture data is input to an output buffer 560 to be output in the original picture order.

According to the above embodiment, it is possible to subject to an interlaced video a predictive coding based on a motion compensation method with good precision, without a motion magnitude detection with respect to the reference picture. Accordingly, the video coding apparatus can be simply constructed, since no motion magnitude detection circuit is required. Further, the motion compensation prediction coding can be applied to a coding sequence by which a motion magnitude detection so as to correspond to a special reproduction performed by a VTR, for example, cannot be performed.

Motion vector searching operations to be performed in the estimation circuits 242 and the read control circuits 221 in FIGS. 7 and 8 and in the amount-of-bits estimation circuit 353 and the read control circuit 224 in FIG. 9 will be described below.

FIGS. 11 to 16 respectively show examples of motion vector searching processing in the present invention. Referring to FIGS. 11 to 16, each of reference symbols s1, s2, . . . , s6 denotes one frame or one field picture, and each of reference numerals 101, 102, . . . , 120 denotes one pixel or a plurality of pixels in the horizontal or vertical direction.

In the motion vector searching operation shown in FIG. 11, in searching for a partial picture to be coded (e.g., s4-104), all the pixels (101 to 120) of the coded picture s3 close in time to the to-be-coded picture are searched, and the search range (area) in the coded picture s2 remoter in time from the to-be-coded picture than the coded picture s3 is limited to a certain range (e.g., 105 to 115) on the basis of an optimum motion vector obtained upon this searching operation, i.e., a motion vector realizing the highest coding efficiency or the most accurate motion vector (e.g., s3-107).

In a searching operation in the coded picture s2 which is remoter in time from the to-be-coded picture, an optimum motion vector (e.g., s2-109 or s3-107) is obtained in addition to the previously obtained optimum motion vector (e.g., s3-107).

Subsequently, the difference between a picture in the region designated by the obtained optimum motion vector (e.g., s2-107) and the partial picture to be coded (e.g., s4-104), i.e., a motion compensation error, is obtained, and the optimum motion vector and the motion compensation error are coded.

Figure 12:
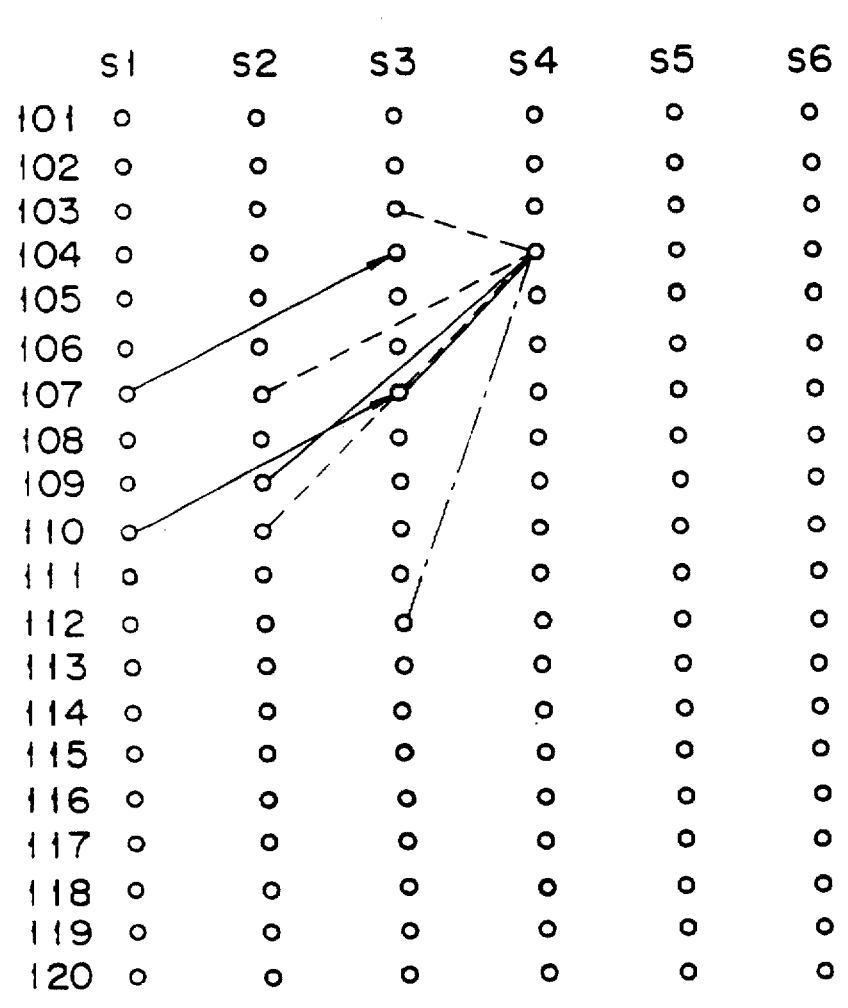
Figure 14:
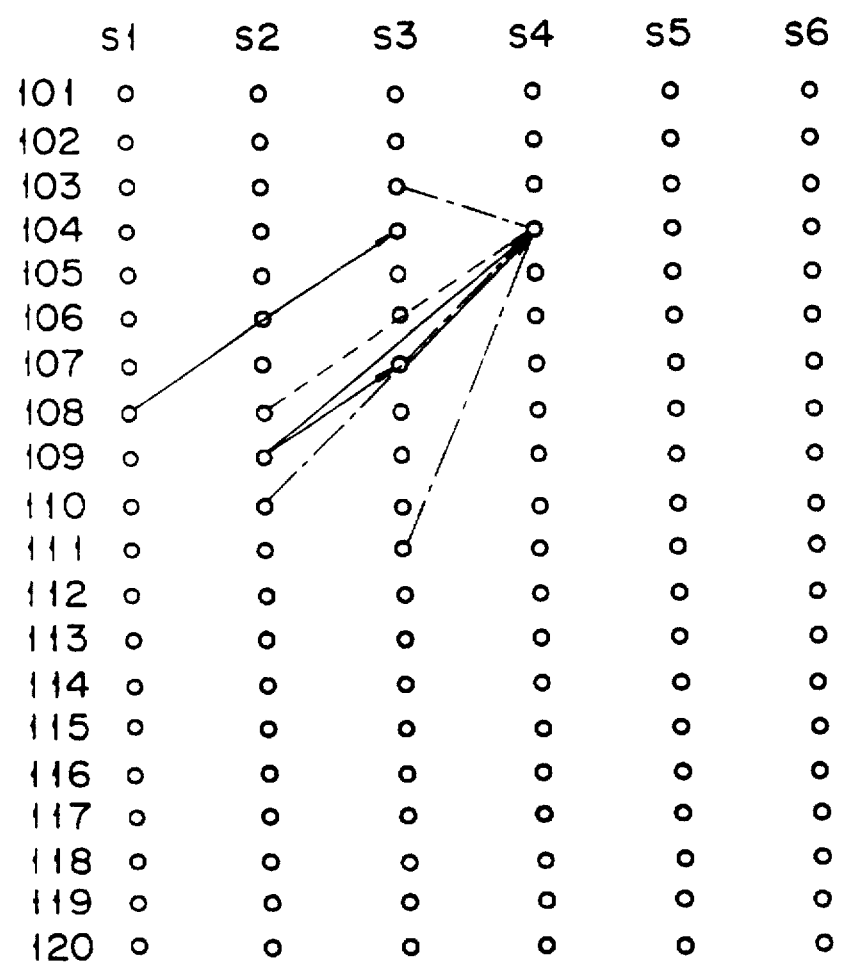

The motion vector searching operations shown in FIGS. 12 to 14 are suitable for a case wherein a picture (e.g., s3) close in time to a to-be-coded picture (e.g., s4) is coded by using a motion vector between this picture (s3) and a picture (e.g., s1) which is remoter in time from the to-be-coded picture. In this case, since a motion vector between a partial picture (s4-104) of the to-be-coded picture and the picture (s3) close in time thereto can be predicted, the search range in the picture (s3) close in time to the to-be-coded picture is limited to, e.g., the range between partial regions 103 and 112. In addition, if a motion vector realizing high coding efficiency is obtained between the to-be-coded picture (s4) and the picture (s3) close in time thereto, the range of regions as vector candidates between the partial region (s4-104) of the to-be-coded picture and a picture (e.g., s2) which is remote in time therefrom can be limited to a narrow range, e.g., the range between partial regions 107 to 110, as shown in FIGS. 13 and 14, by using a motion vector between a partial region (e.g., s1-110) of a picture remoter in time from the to-be-coded picture than a partial region (e.g., s3-107) closer in time to the to-be-coded picture, which is designated by the motion vector, and the partial region (s4-104) of the to-be-coded picture.

The motion vector searching operation shown in FIG. 15 is suitable for a case wherein since the motion between pictures is large, no motion vector candidate exists even in the picture s3 close in time to the to-be-coded picture s4, or a case wherein since a motion vector (e.g., s3-116 to s4-104) obtained as a candidate in the picture s3 close in time to the to-be-coded picture is very large, it can be predicted that no motion vector realizing high coding efficiency exists in the picture s2 remote in time from the to-be-coded picture.

In such a case, a search for a motion vector is not performed in the picture s2 which is remote in time from the to-be-coded picture, or the search range can be further limited to, e.g., the range between partial regions 116 and 120. With this operation, a motion vector realizing high coding efficiency can be obtained with a small arithmetic operation amount required for a motion vector searching operation.

Figure 16:
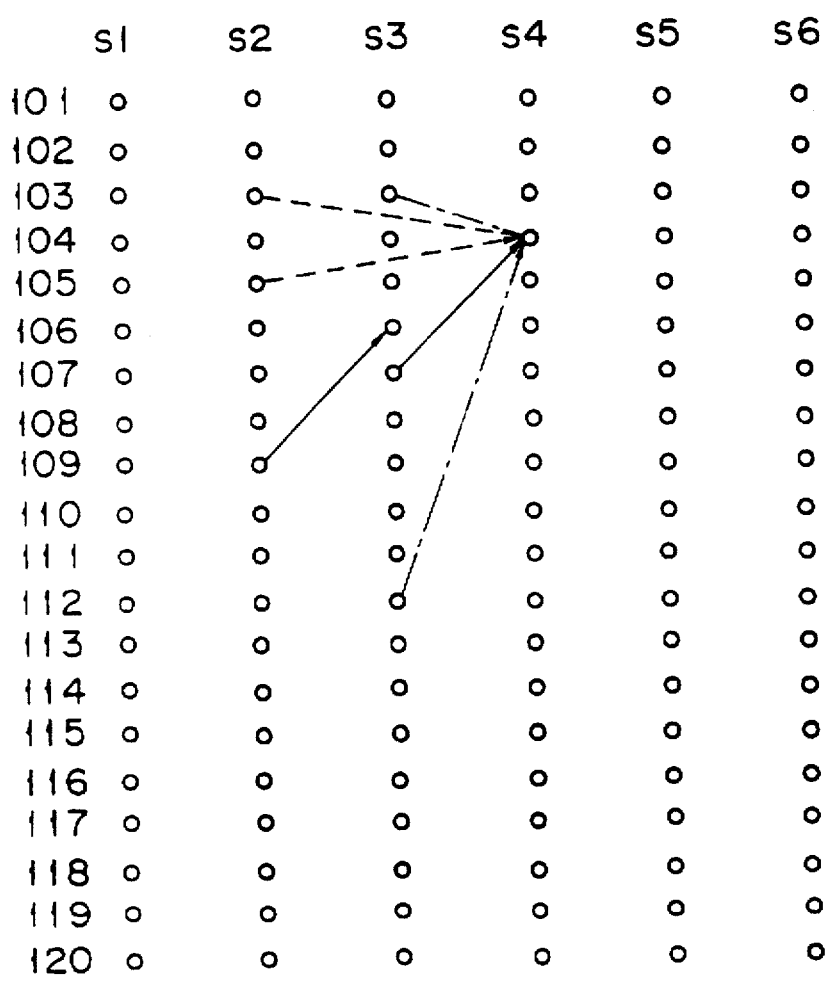

The motion vector searching operation shown in FIG. 16 is suitable for a case wherein a motion vector (e.g., s3-107 to s4-104) obtained between the partial picture s4-104 of the to-be-coded picture and the picture s3 close in time thereto is relatively large, or a case wherein no proper motion vector can be obtained. In such a case, a search for a motion vector in the picture s2 remote in time from the to-be-coded picture is not performed. A motion vector searching operation in the picture s2 remote in time from the to-be-coded picture, however, is performed by limiting the search range in the picture s2 to the range between partial regions near the position of the partial picture of the to-be-coded picture, e.g., the range between the partial regions 103 and 105, only when the motion vector between the to-be-coded picture and the picture s3 close in time thereto is small.

If the motion between pictures close in time to each other is large, since a blur caused by the motion exists even in one picture obtained by normal photography using a camera, it is difficult to produce differences in units of ½ pixels in motion compensation between the pictures. That is, in such a case, even if a motion vector is obtained between the to-be-coded picture and a picture remoter in time therefrom, the coding efficiency cannot be improved much in spite of an increase in arithmetic operation amount for the searching operation. According to the example shown in FIG. 16, in the case wherein the motion between pictures is large, since a motion vector between the to-be-coded picture and a picture remote in time therefrom is not coded, the number of types of coding is decreased, and the coding efficiency is further improved.

According to the above embodiment, an accurate motion compensation and a high coding efficiency can be attained notwithstanding that an amount of arithmetic operation required for the motion vector searching is decreased.

Note that as a coding method, the present invention can employ any one of the following methods: intra-frame coding, intra-field coding, inter-frame difference coding, and inter-field difference coding, and can use such a method in combination with another coding scheme. In addition, the motion vector searching method of the present invention can be applied to a case wherein pictures coded in advance at intervals of an arbitrary number of pictures are used as reference pictures, and a motion vector in a picture between the reference pictures is obtained. Therefore, a search for a motion vector can be performed by using pictures before and after a to-be-coded picture.

A video coding apparatus according to the sixth embodiment of the present invention will be described below with reference to FIG. 17.

Figure 18:
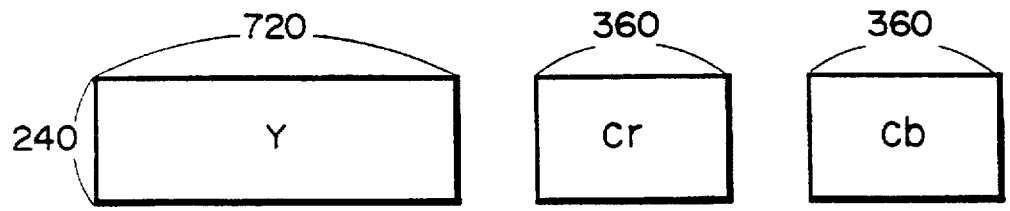
FIG. 18 is a view showing an input picture format in the sixth embodiment.

In this embodiment, a coding algorithm basically employs a motion compensation and DCT scheme, and the input picture format is an interlace format such as a picture format defined by CCIR Rec. 601/525. FIG. 18 shows this picture format. Referring to FIG. 18, reference symbol Y denotes a brightness signal; and Cr and Cb, color signals, respectively. The number of pixels of each signal per field is also shown in FIG. 18.

Figure 19:
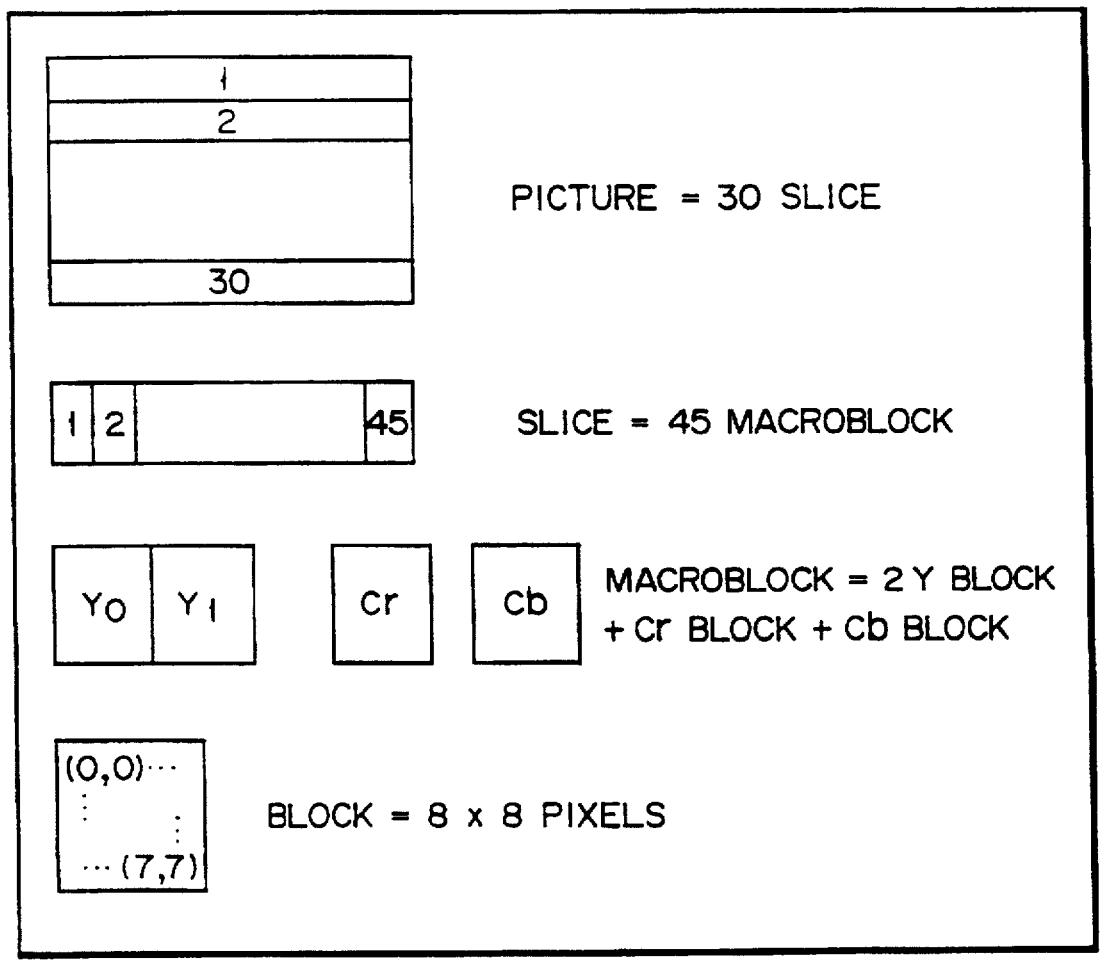
FIG. 19 is a view showing the hierarchical structure of coding units in the sixth embodiment.

Coding units are arranged in a hierarchy. That is, as shown in FIG. 19, "block", "macroblock", "slice", "picture", "group of pictures" (not shown), and "sequence" (not shown) are hierarchically arranged in the order named. A block is constituted by 8×8 pixels. DCT is performed in units of blocks. A macroblock is constituted by a total of four blocks, i.e., two Y blocks, one Cr block, and one Cb block. Motion compensation and selection of the respective coding modes are performed in units of macroblocks.

A group of pictures (GOP) has the following arrangement. Pictures are roughly classified into I, P, and B pictures depending on the types of modes allowed as prediction modes and selected in units of macroblocks. The modes include four modes (to be described in detail later), i.e., an intra-field prediction mode (Intra), a forward prediction mode (Inter: including motion compensation), a backward prediction mode, and a bidirectional interpolation prediction mode. As shown in Table 1, pictures are classified into three types, i.e., I, P, and B pictures depending on the types of prediction modes to be used. These pictures I, P, and B are coded in accordance with quantization step sizes determined by a relation of I<P<B. Namely, the picture I is coded with a quantization step size smaller than in the picture P, and the picture P with a smaller quantization step size than in the picture B. The ratio of the amounts of bits of these coded pictures is previously determined.

TABLE 1

| Picture Type | Macroblock Mode which can be selected |
|---|---|
| I picture | intra-field prediction mode |
| P picture | intra-field prediction mode |
| | forward prediction mode |
| B picture | intra-field prediction mode |
| | forward prediction mode |
| | backward prediction mode |
| | bidirectional interpolation prediction mode |

This embodiment employs an interlace format as a coding picture format. In this format, since different prediction methods are used even for pictures of the same type depending on their positions in GOP, the pictures can be further classified.

The arrangement of GOP and the manner of predicting pictures from specific pictures will be described below with reference to FIGS. 20A and 20B.

As shown in FIGS. 20A and 20B, GOP is defined by a group of pictures, starting from the B0 picture preceding one of the I pictures, which are periodically arranged as entry points for random access and special reproduction, and ending at the P2 picture located before the next I picture. The I pictures appear only in even fields. In addition, Table 2 and FIGS. 21A and 21B show the manner of predicting the respective pictures from specific pictures.

TABLE 2

| Picture type | Prediction method |
|---|---|
| I | No prediction |
| P0 | Inter-field forward prediction from past I |
| P1 | Inter-field/Inter-frame adaptive forward prediction from past I and P0 (or P1 and P2) |
| P2 | Selection from inter-field/inter-frame adaptive forward prediction from past I and P0 (or P1 and P2) and inter-field forward prediction from past P1 |
| B0 to B3 | Selection from inter-field/inter-frame adaptive forward prediction from past I |

TABLE 2-continued

| Picture type | Prediction method |
|---|---|
| | and P0 (or P1 and P2), inter-field/inter-frame adaptive backward prediction from I and P0 (or P1 and P2) in the future, and bidirectional interpolation prediction from past P1 and P2 (or (I and P0) and P1 and P2 (or I and P0) in the future |

There are two prediction methods: an inter-field prediction method in which prediction is performed only from an even field; and an inter-field/inter-frame adaptive prediction method in which prediction is adoptively performed from even and odd fields in units of fields.

Referring to FIGS. 21A and 21B, each arrow indicates that inter-field prediction is performed, and each symbol consisting of one arrow and two lines combined with each other by the arrow indicates that inter-field/inter-frame adaptive prediction is performed. FIG. 20B shows the coding order of the respective pictures within one GOP.

In consideration of the above-described points, the video coding apparatus shown in FIG. 17 will be described below.

Figure 17:
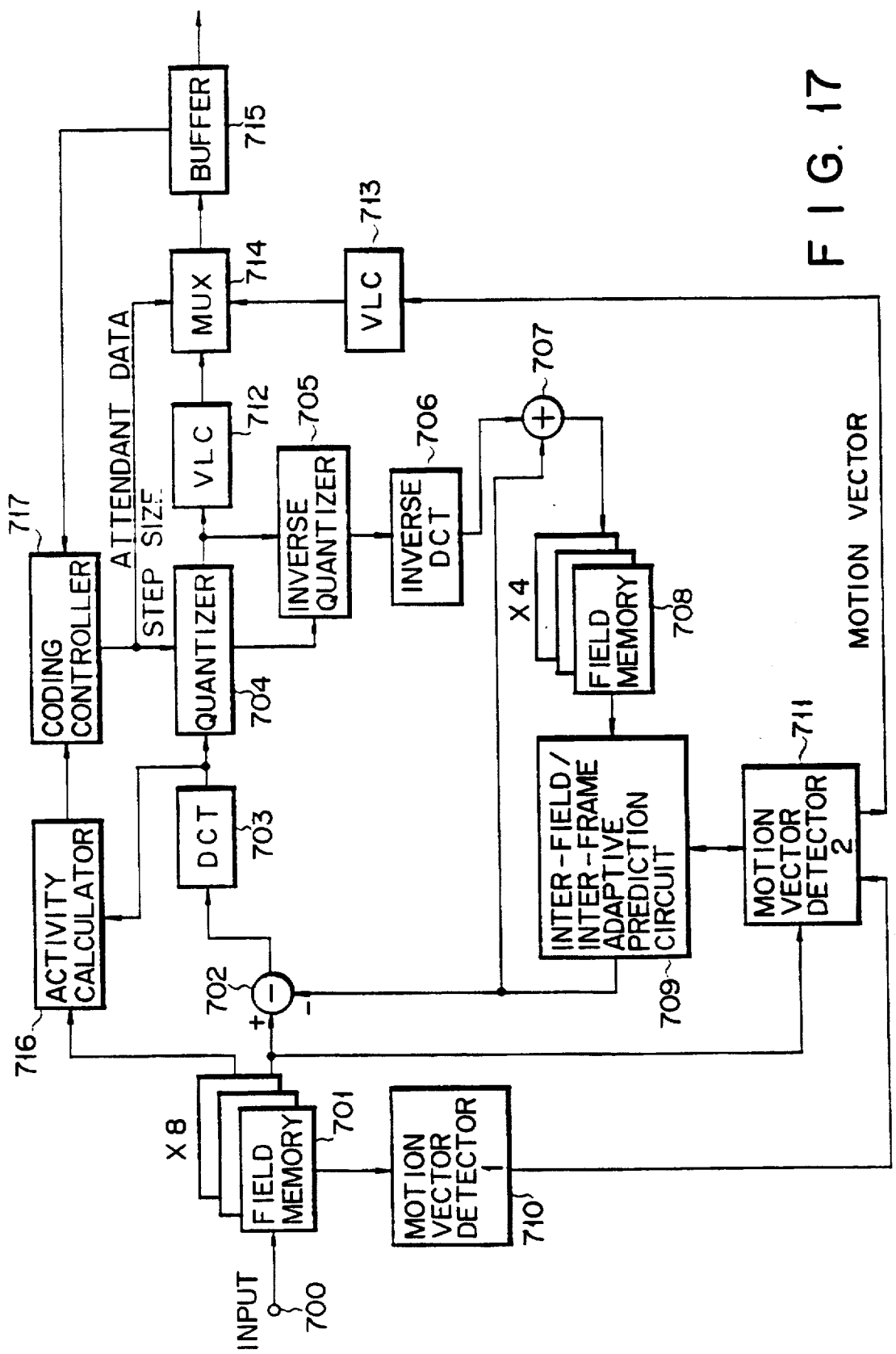
FIG. 17 is a block diagram showing a video coding apparatus according to the sixth embodiment of the present invention.

Referring to FIG. 17, an interlaced video signal is input to an input terminal 700. Successive components of the input video signal which correspond to eight fields are stored in field memories 701. The video signal in the field memories 701 is supplied to a first motion vector detector 710, and motion vector detection is performed by a telescopic search (to be described later) using an original motion picture with a precision of one pixel. This processing is the first step of motion compensation.

Subsequently, in preprocessing for the second step of motion compensation, the motion vector obtained by the motion vector detector 710 using the original motion picture is refined by searching a whole range of ±1 pixels around the target pixel using local decoded signals stored in field memories 708 in a local decoder loop.

In the second step of motion compensation, motion vector detection is performed with a precision of ½ pixels by the field memories 708, an inter-field/inter-frame adaptive prediction circuit 709, and a second motion vector detector 711 using the local decoded signals. As a result, a prediction signal is generated by the prediction circuit 709. This prediction signal is input to a subtracter 702, and the difference between the prediction signal and the video signal from the field memories 701 is calculated. The difference is then output as a predictive error signal.

Discrete cosine transformation of the predictive error signal is performed by a DCT circuit 703 to obtain DCT coefficient data. The DCT coefficient data is quantized by a quantizer 704 and is subjected to adaptive scanning. The resultant data is then input to a multiplexer 714 through a two-dimensional variable length coding circuit 712. The quantized DCT coefficient data is locally decoded through an inverse quantizer 705 and an inverse DCT circuit 706, and only the I and P pictures are written in the field memories 708. The number of field memories 708 to be prepared corresponds to four fields required for adaptive prediction.

In the multiplexer 714, the DCT coefficient data, a motion vector from the second motion vector detector 711 (to be described later), and additional information such as macroblock type data and quantization size data from a coding controller 717 are multiplexed. The information multiplexed by the multiplexer 714 is transmitted at a constant transmission rate through a buffer 715 to be output to a storage device such as a VTR or a recording device.

The coding controller 717 controls the quantization step size in the quantizer 704 on the basis of the buffer capacity of the buffer 715 and an intra-macroblock activity (I picture) calculated by an activity calculator 716 or the intra-macroblock activity (P or B picture) of a signal before quantization in the same mode, located immediately before the current picture.

The arrangement of a video decoding apparatus corresponding to the video coding apparatus shown in FIG. 17 will be described below with reference to FIG. 22.

A signal read out from a recording device is input to an input terminal 800 and is temporarily stored in a buffer 801. The signal read out from the buffer 801 is input to a demultiplexer/variable length decoding circuit 802. As a result, the additional information such as DCT coefficient data, motion vector data, and step size data multiplexed by the multiplexer 714 shown in FIG. 17 is separated from the signal and is decoded.

More specifically, the DCT coefficient data is subjected to two-dimensional variable length decoding and scan conversion. The resultant data is then subjected to decoding through an inverse quantizer 803 and an inverse DCT circuit 804, similar to the local decoding loop in the video coding apparatus shown in FIG. 17. The decoded data is input to an adaptive prediction circuit 807 through an adder 805 and field memories 806 corresponding to four fields. Since the motion vector data is transmitted as difference data, as will be described later, the data is subjected to variable length decoding and is subsequently restored to the original data. The restored data is then supplied to the adaptive prediction circuit 807. The adaptive prediction circuit 807 generates a prediction signal. When this prediction signal and the signal from the inverse DCT circuit 804 are added together by the adder 805, the original video signal is extracted through the field memories 806. The outputs from the field memories 806 are supplied to a picture display circuit (not shown).

In a picture display operation, the decoding sequence and the display sequence are different from each other, and the B picture need not be stored in the field memories because it is not used for prediction. For these reasons, switching is performed such that the I and P pictures are output from the field memories 806, while the B picture is directly output while it is decoded.

Motion compensation and motion vector detection in this embodiment will be described in detail below.

The motion compensation is performed in units of macroblocks, as described above. The motion vector detection includes motion vector detection performed in the first motion vector detection circuit 710 by normal block matching with a precision of one pixel, and motion vector detection performed in the second motion vector detection circuit 711, which searches for motion vectors at points obtained by performing adaptive spatial-temporal interpolation with respect to pixel positions set, with a precision of ½ pixels, around a reference picture designated by the motion vector with a precision of one pixel. A method of performing spatial-temporal interpolation will be described in detail later.

The motion vector detection in the first motion vector detection circuit 710 is performed to search for an optimum motion vector by searching all the pixels of each field with a precision of one pixel using each field picture of an input video. A searching operation between fields spaced apart from each other is performed by using telescopic search processing (refer to Simulation Model No. 3). With regard to field pictures, a plurality of paths can be considered as search paths between fields. In this embodiment, search paths are determined in accordance with the following rules:

1) A search between in-phase fields is performed by using only in-phase fields.

2) A search between reverse phase fields is performed by using as little reverse phase fields as possible.

Figure 24:
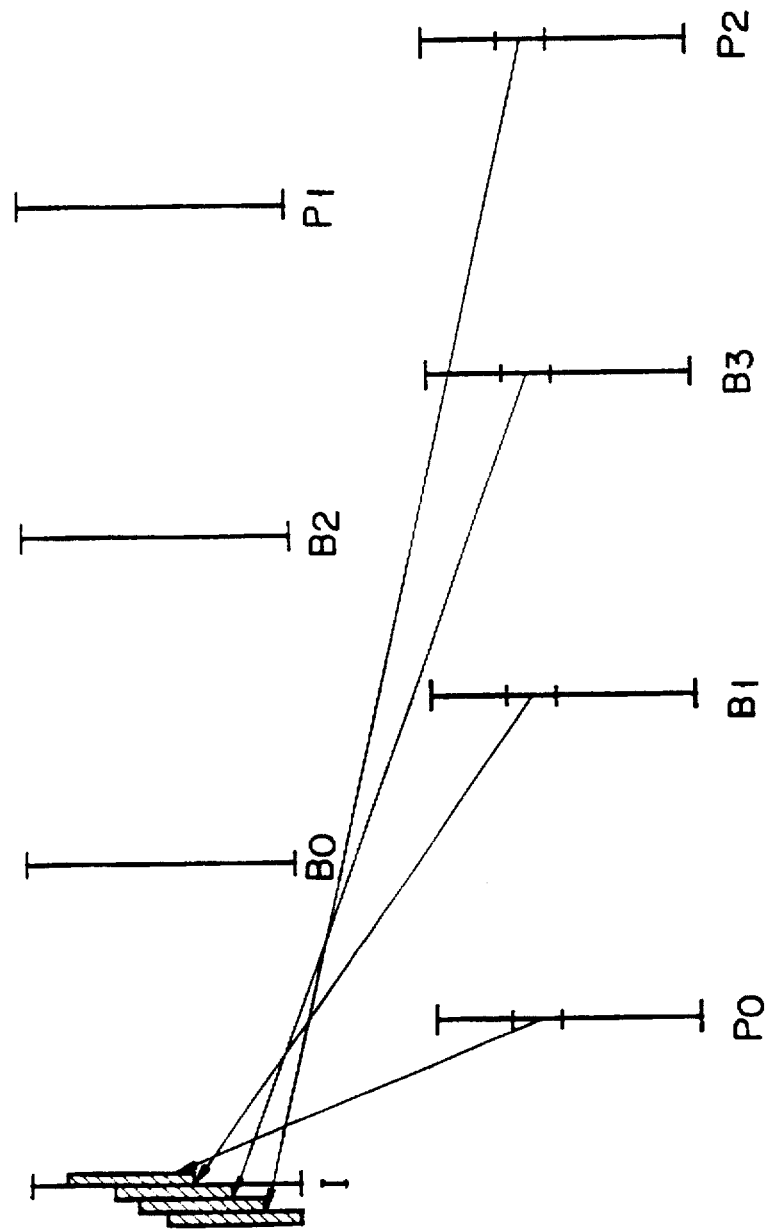
FIG. 24 is a view showing a telescopic search sequence in the sixth embodiment.

A search between reverse phase fields must be included in search paths only once. In this embodiment, as indicated by the telescopic search order shown in FIG. 24, fields having difference phases are searched first. For example, when a motion vector between the I and P2 pictures is to be detected, search processing is performed in the order of I→P0→B1→B3→P2 but is not performed in the order of I→B0→B2→P1→P2. Note that the hatched portion in FIG. 24 indicates a search range. This telescopic search processing is independently performed in the forward and backward directions. In addition, the search range between adjacent fields is defined by horizontal ±15 pixels and vertical ±7 pixels.

The motion vector detection in the second motion vector detection circuit 711 is performed by using pictures stored in the field memories 708 in the local decoding loop as reference pictures. In preprocessing for this motion vector detection, the motion vector is refined by searching a whole range of ±1 pixels around the reference picture designated by the motion vector obtained by the first motion vector detection circuit 710. In the main process of the motion vector detection in the second motion vector detection circuit 711, the values of predictive error power of all the prediction signal candidates generated, by a method to be described later, at positions with a precision of ½ pixels around the reference picture designated by the motion vector obtained by the refining process are estimated and compared with each other, thereby selecting an optimum prediction signal candidate.

Note that motion vector detection is not performed with respect to a color signal, but motion compensation is performed on the basis of a motion vector obtained with respect to a brightness signal.

Figure 23:
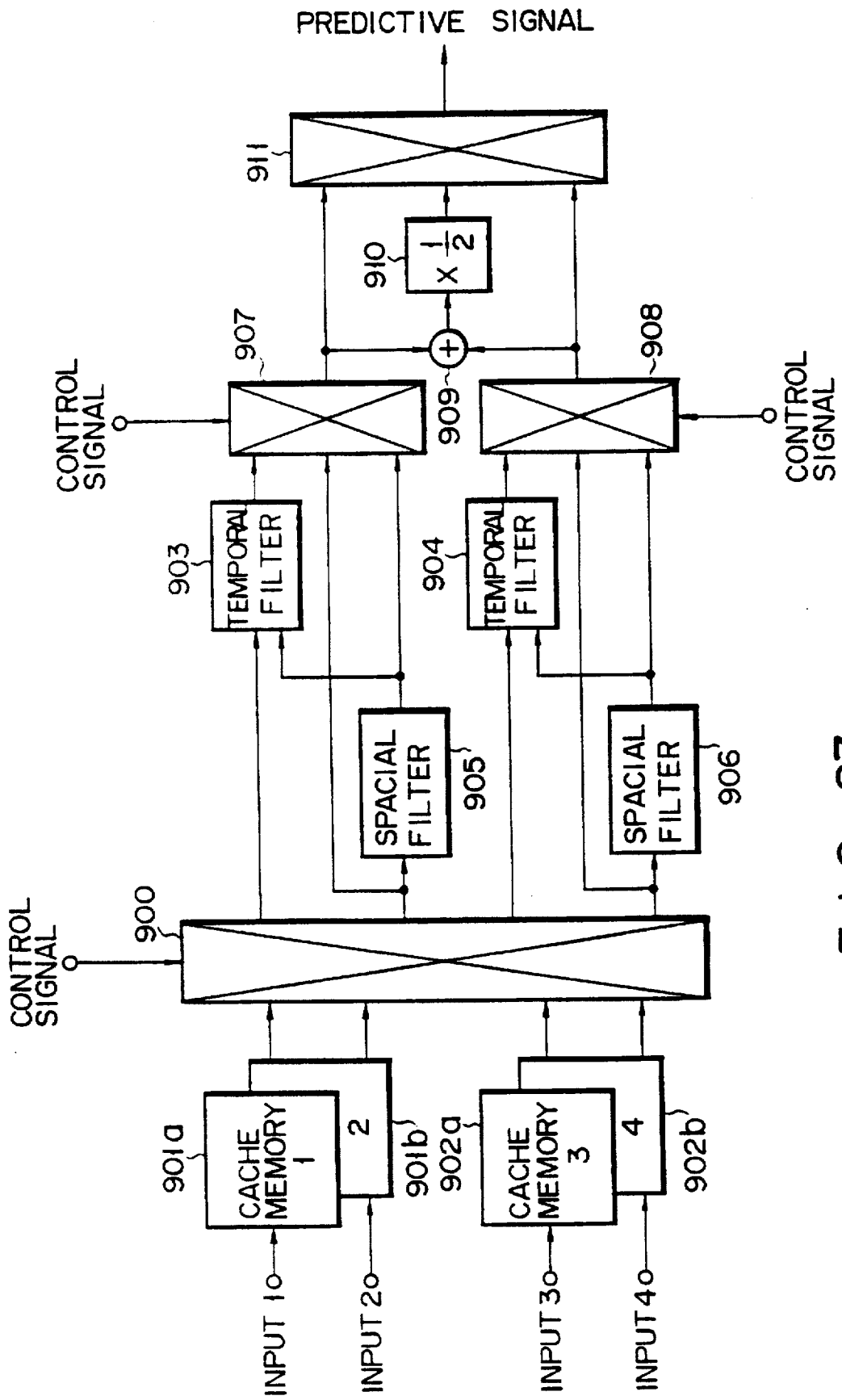
FIG. 23 is a block diagram showing an inter-field/inter-frame adaptive prediction circuit in FIG. 17.

Processing to be performed by the inter-field/inter-frame adaptive prediction circuit 709 shown in FIG. 17 will be described below with reference to FIG. 23 which is a block circuit showing part of the inter-field/inter-frame adaptive prediction circuit 709.

As described above, in the second step of motion compensation, searching is performed in a range of ½ pixels around the reference picture designated by the motion vector obtained by the first motion vector detection circuit 710. FIG. 25B shows the state of this processing. This inter-field/inter-frame adaptive prediction is performed with respect to each of the P1, P2, and B pictures by using, e.g., a pair of even and odd fields #1 and #2 before a to-be-coded picture (field to be coded) as reference pictures (reference fields).

Assume that optimum points (indicated by "●") at the reference fields #1 and #2 are respectively obtained by the motion vector detection circuit 710 using motion vectors V1 and V2 in the first step of motion compensation shown in FIG. 25A. In the second step of motion compensation shown in FIG. 25B, a plurality of prediction signal candidates are obtained by performing spatial-temporal filtering of reference pictures in ranges of ½ pixels around the two optimum points designated by the motion vectors V1 and V2 in the inter-field/inter-frame adaptive prediction circuit 709.

Subsequently, a search for an optimum motion vector is performed by the motion vector detection circuit 711 on the basis of the prediction signal candidates and the motion vectors detected by the motion vector detection circuit 710. In this case, prediction signal candidates are generated in two modes, i.e., a field interpolation mode and a frame interpolation mode.

In the field interpolation mode, prediction signal candidates are generated by using only a spatial filter. That is, the pixel values of pixels "A" to "C" in FIG. 25B are obtained according to the following equations:

$$A=(O+D)/2$$

$$B=(O+D+E+F)/4$$

$$C=(O+F)/2$$

In this field interpolation mode, there are nine search points for prediction signal candidates for even and odd fields each, i.e., a total of 18 search points.

In contrast to this, in the frame interpolation mode, prediction signal candidates are formed by performing spatial-temporal filtering of signals obtained by performing motion compensation for the respective fields. For example, the pixel values of the pixels "A" to "C" in FIG. 25B are obtained according to the following equations:

$$A=G/2+(O+D)/4$$

$$B=G/2+(O+D+E+F)/8$$

$$C=G/2+(O+F)/4$$

In this case, a field for providing data at a pixel position with a precision of ½ pixels will be referred to as a reference field. In this frame interpolation mode, although each of even and odd search fields has nine search points for prediction signal candidates, since prediction signals at the positions of pixels "O" coincide with each other, a total of 17 search points for prediction signal candidates exist.

In the second step of motion compensation, searching of prediction signal candidates at 35 search points, the sum of the search points in the two modes, is performed, and a prediction signal candidate having the minimum predictive error is determined as a prediction signal. If, however, the directions of motion vectors between two fields greatly deviate from each other, the frame interpolation mode is not selected (to be described in detail later).

Information indicating the selection of the field interpolation mode or the frame interpolation mode and information indicating a specific field selected as a reference field used for the field interpolation mode or the frame interpolation mode are transmitted by one-bit flags. Note that prediction by means of fields immediately before the P0 and P2 pictures is performed by only a mode in which the field interpolation mode is adapted for a single field. In this case, a mode selection flag is not transmitted.

Although the above description is associated with the P picture, almost the same processing applies to the B picture. With regard to the B picture, however, only fields which are in phase with a field to be coded are selected as search fields in the field interpolation mode and as reference fields in the frame interpolation mode. It is apparent that in this case, a flag indicating the selection of a specific field is not transmitted.

The manner of realizing the above principle on hardware in practice will be described below with reference to the block diagram of FIG. 23.

Of the video signals output from the field memories 708 corresponding to four fields, shown in FIG. 17, signal components designated by motion vectors obtained by preprocessing for the second motion vector detection are stored in cache memories 901a, 901b, 902a, and 902b. In accordance with control signals from the second motion vector detection circuit 711, a switch circuit 900 distributes outputs from the cache memories 901a and 901b to a temporal filter 903 and a spatial filter 905, and also distributes outputs from the cache memories 902a and 902b to a temporal filter 904 and a spatial filter 906.

A selector 907 selects either a signal passing through only the spatial filter 905 or a signal passing through both the spatial and temporal filters 905 and 903 in accordance with a control signal output from the second motion vector detection circuit 711 which instructs whether to select the field interpolation mode or the frame interpolation mode. A selector 908 has the same function as that of the selector 907. Assume that a signal representing a pixel "G" shown in FIG. 25B is input from the switch circuit 900 to the temporal filter 903, and a signal representing a pixel "B" shown in FIG. 25B is output from the spatial filter 905. In this case, a signal obtained by averaging the signals representing the pixels "G" and "B" i.e., temporal space filtering, can be obtained as an output from the temporal filter 903. Therefore, an output from the spatial filter 905 is selected in the field interpolation mode, and an output from the temporal filter 903 is selected in the frame interpolation mode.

Outputs from the selectors 907 and 908 are directly input to a selector 911. At the same time, the outputs are added together by an adder 909, and the product is divided by 2 by a divider 910. The resultant signal is then input to the selector 911. The selector 911 selectively outputs these three inputs, i.e., the signal in the forward direction by using the reference fields #1 and #2 as an output from the selector 907, the signal predicted in the backward direction by using the reference fields #3 and #4 as an output from the selector 908, and the signals bidirectionally predicted by averaging the outputs of the selectors 907 and 908 as an output from the divider 910. For each of the forward and backward predictions of these 35 prediction signal candidates, a prediction signal candidate having the minimum predictive error is determined as a prediction signal by the motion vector detection circuit 711 in the above-described manner. The motion vector detection circuit 711 then sends information indicating this determination to the inter-field/inter-frame adaptive prediction circuit 709. With this operation, the inter-field/inter-frame adaptive prediction circuit 709 outputs the prediction signal designated by the motion vector detection circuit 711 to the subtracter 702 and an adder 707.

The manner in which a motion vector from the second motion vector detection circuit 711 is coded to be transmitted will be described below.

A motion vector in the field interpolation mode or a motion vector on the reference field side in the frame interpolation mode is coded as a reference vector by a variable length coding circuit 713. The reference vector is then transmitted to the multiplexer 714. This motion vector a (reference vector) has a precision of ½ pixels. If the frame interpolation mode is selected, the difference between a motion vector b and a motion vector obtained by extending a motion vector (reference vector) in the reference field #2 from the to be coded field (C) to a value at the other field (Ref. field #2) is coded and transmitted. This may be accomplished by determining the difference d between a point or pixel (dark circle) nearest to the point (triangle) at which the extended line of the motion vector a (first motion vector) in the reference field crosses the #2 reference field and the motion vector is transmitted with a precision of one pixel. This point or pixel closest to the point at which the motion vector a crosses the #2 reference field is the tip of the third motion vector. If the difference d between the directions of these two motion vectors exceeds a range of ±1, the frame interpolation mode is not selected, assuming that the frame interpolation mode is not effective unless the directions of the two motion vectors are close to each other.

FIG. 26 shows a detailed example of how the above-mentioned motion vector d is transmitted, in which the difference d between a motion vector b (second motion vector) with a precision of one pixel (indicated by the arrow on the lower side in FIG. 26) in the reference field #2 and a point "●" nearest to a point "Δ" at which a motion vector a with a precision of ½ pixels (indicated by the arrow on the upper side in FIG. 26) in the reference field #1 crosses reference field #2 is transmitted with a precision of one pixel. In the case shown in FIG. 26, the difference is −1. With this operation, the information amount of a motion vector can be saved without causing a deterioration in prediction performance.

Motion compensation for color signals will be described next.

As shown in FIG. 19, in one macroblock, the brightness signal Y and the color signals Cr and Cb have the same number of pixels in the vertical direction, but the number of each color signal is ½ that of the brightness signal Y in the horizontal direction. For this reason, when a motion vector obtained from a brightness signal is to be applied to a color signal, the horizontal components of the motion vector is reduced to ½. when the motion vector is divided by 2, fractions are rounded to "0". This equally applies to both the field interpolation mode and the frame interpolation mode.

Figure 27:
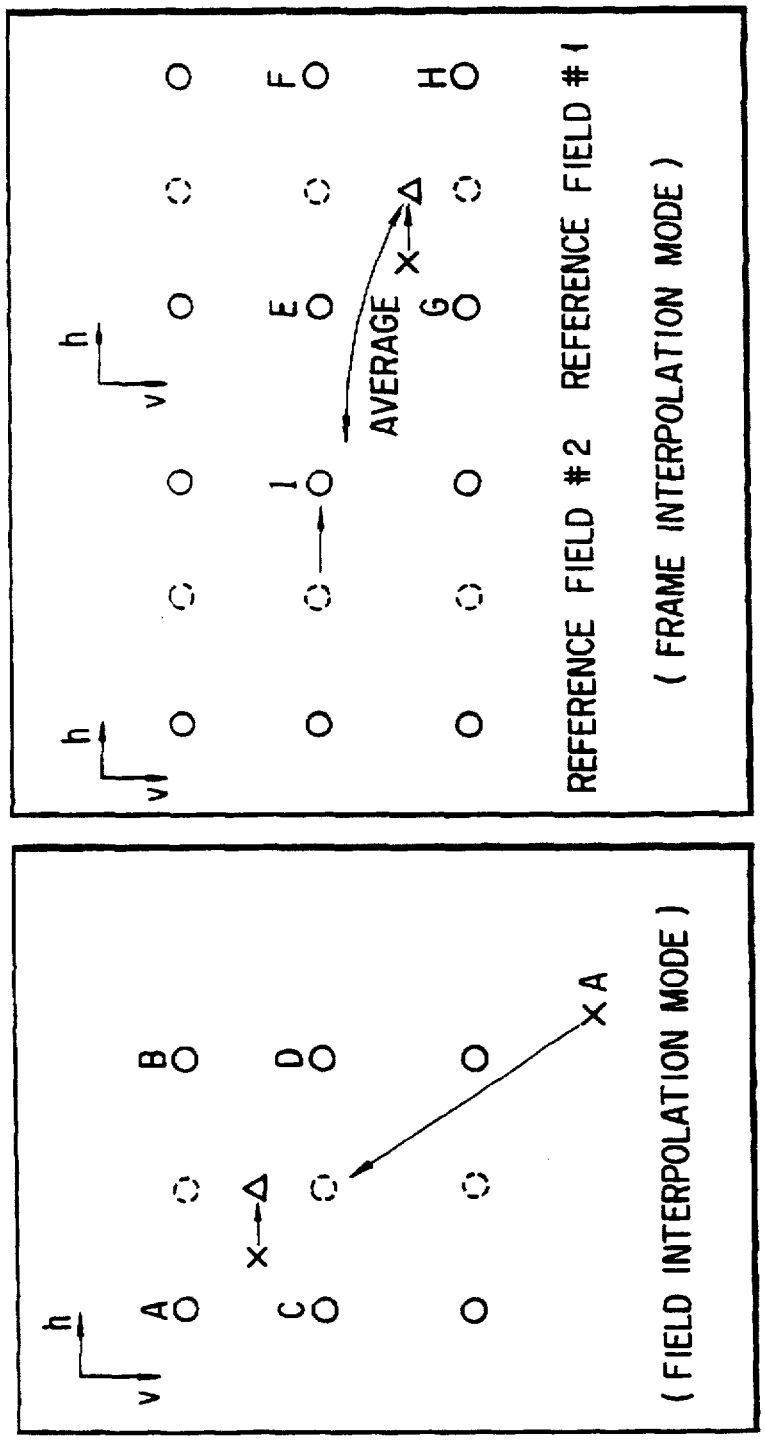
FIGS. 27A and 27B are a detailed example in which the moving vector of a color signal is obtained from a motion vector in the sixth embodiment.

FIGS. 27A and 27B respectively show detailed examples of how the motion vector of a color signal is obtained from the motion vector of a brightness signal in the field interpolation mode and the frame interpolation mode. Referring to FIGS. 27A and 27B, the broken circles indicate pixel positions where no color signals exist. Assume that the pixel position obtained in the first step is indicated by the circle at the central position, and the point obtained in the second step is indicated by "x". Assume that in either mode, the horizontal coordinate value of an origin is larger than that of the circle at the central position. In the field interpolation mode shown in FIG. 27A, if the motion vector of a brightness signal is obtained at the position of the point "x", the ¼-pixel-precision component of a color signal is rounded into the direction toward zero to form an interpolated pixel "Δ". This interpolated pixel "Δ" is formed by $$\Delta = (A+B+C+D)/4$$

Similarly, in the frame interpolation mode shown in FIG. 27B, an interpolated pixel Δ in the reference field #1 is formed by $$\Delta = (E+F+G+H)/4$$

In the reference field #2, the ½-pixel-precision component of a color signal is rounded in the direction toward zero, and a pixel at a position "I" is used as an interpolated pixel. That is, in the cases shown in FIG. 27B, the value of the spatio-temporally interpolated pixel Δ is obtained by $$I \times ½ + (E+F+G+H)/8$$

According to the above embodiment, a motion compensation prediction suitable for an interlaced video by effectively using a number of fields can be realized with high effectivity and precision.

Figure 28:
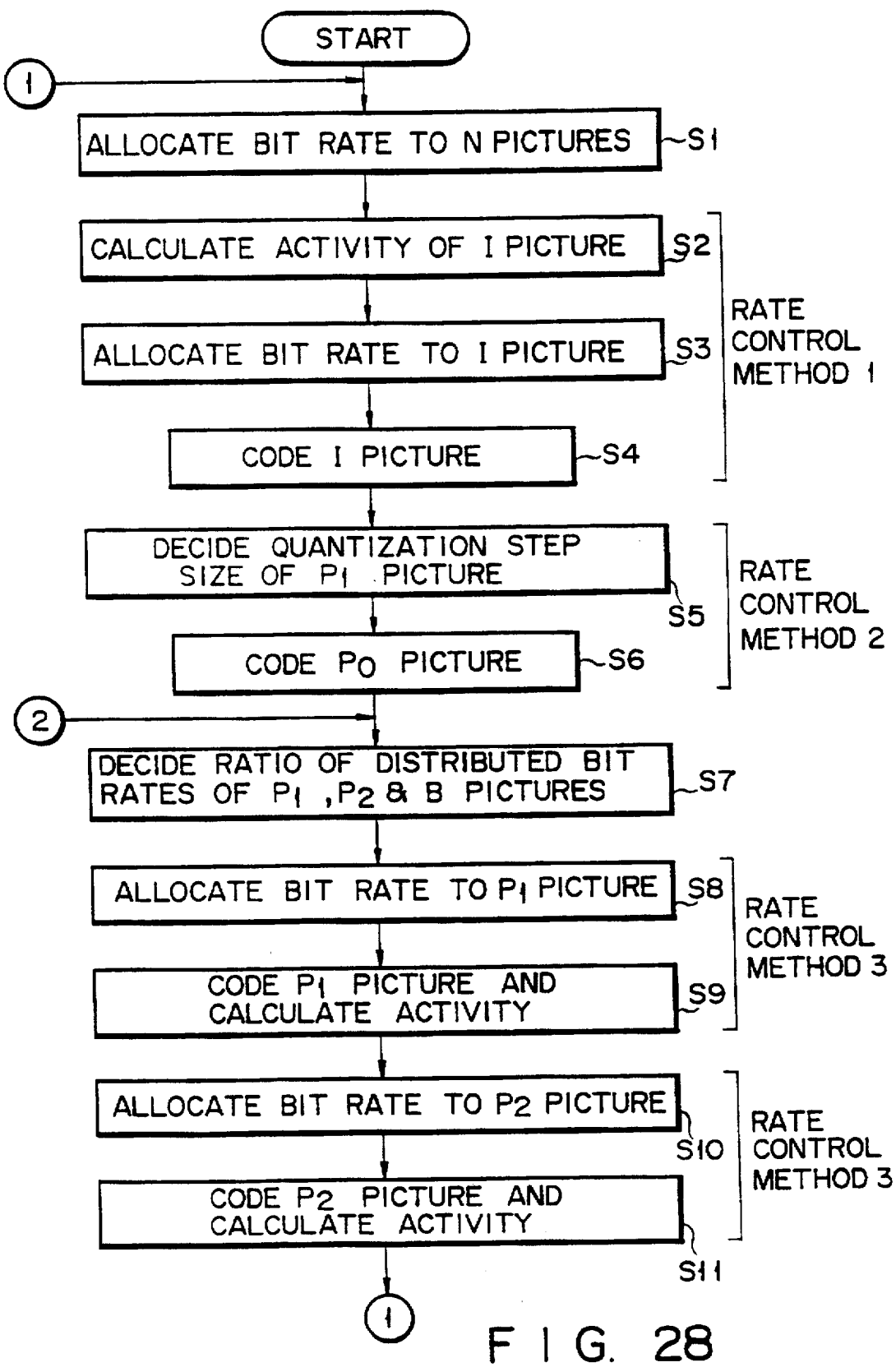
FIG. 28 is a flow chart showing part of the process of coding and rate control in the sixth embodiment.
Figure 29:
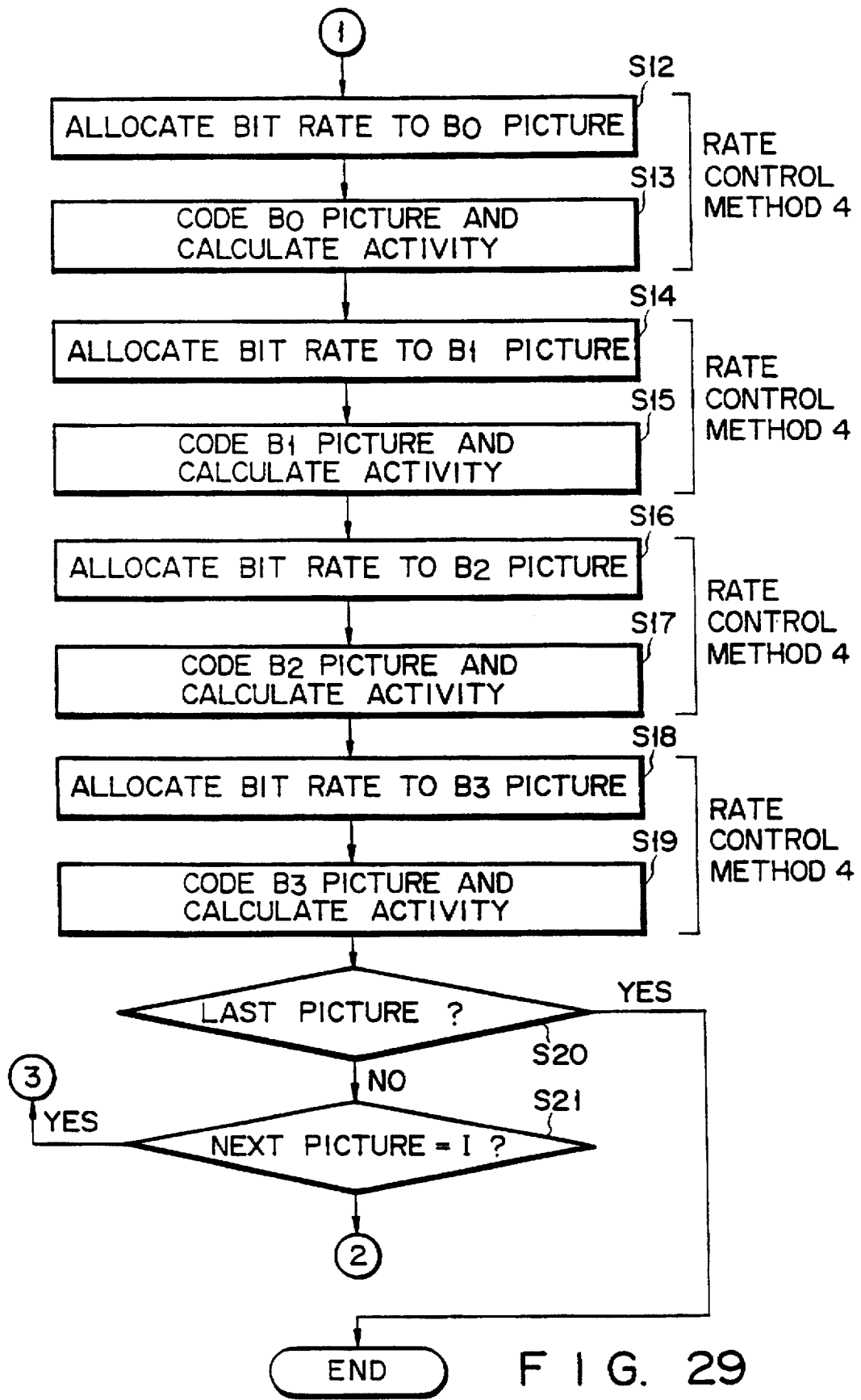
FIG. 29 is a flow chart showing the remaining part of the process of coding and rate control in the sixth embodiment.

Rate control will be described next with reference to the flow charts shown in FIGS. 28 and 29. The rate control is performed in the following three processes:

(1) allocating an amount of bits (a bit rate) to N pictures from the I picture to the B3 picture immediately before the next I picture;

(2) allocating and updating an amount of bits for each picture; and (3) controlling the quantization step size in each picture by using a virtual buffer.

In this embodiment, an estimation amount called an activity is calculated by the activity calculator 716, as described above, and this estimation amount is used for rate control. The activity of the I picture is the sum total of the absolute values of values obtained by subtracting an average value in a block from the respective pixel values. The activity of each of pictures of the other types is the sum total of the absolute values of DCT coefficients of motion compensation adaptive predictive error signals obtained through the subtracter 702 and the DCT circuit 703. The activity of the I picture is calculated one field before coding. The activities of the other pictures are calculated in coding. The rate control of a given picture is performed by using the activity of the same type of picture coded immediately before the current picture.

The processes (1) to (3) of the above-described rate control will be described in detail below with reference to the flow charts shown in FIGS. 28 and 29.

(1) Bit rate allocation in units of N pictures (step S1)

Bit rate control is performed such that the amount of bits of N pictures from the I picture to the B picture immediately before the next I picture approaches a fixed value CAG (constant-allocate-gop). An excess or shortage of the amount of bits obtained by this control is carried over to the amount of bits allocated to next N pictures, as shown in FIG. 30. At the end of coding of N pictures, a difference LOBG (left-over-bits-gop) between an allocated amount of bits ABG (allocated-bits-gop) and an amount of bits GBG (generated-bits-gop) is calculated according to the following equation (1):

$$LOBG = ABG - GBG \qquad (1)$$

An amount of bits obtained by adding the fixed allocated amount of bits CAG to the excess or shortage LOBG of amount of bits according to the following equation (2) is allocated to the next N pictures:

$$ABG = CAG + LOBG \qquad (2)$$

(2) Allocation of amount of bits to each picture

An amount of bits allocated to each picture is determined to satisfy the above-described conditions in accordance with the following rules (I) and (II):

(I) When the ratios of quantization step sizes Q·I, Q·P, and Q·B of the I, P1, P2, and B pictures are set according to the following equation (3), high coding efficiency is ensured, and no deterioration in picture quality occurs:

$$Q·I : Q·P : Q·B = 1 : \alpha Q0 : \alpha Q \qquad (3)$$

where αQ0 and αQ are constants. The ratio of the amounts of bits allocated to the respective pictures is updated such that the ratio of the quantization step sizes coincide with the ratio defined by equation (3).

(II) Excess bits of coded pictures of the N pictures are carried over for amount-of-bits allocation to non-coded pictures in the N pictures, and allocated amounts of bits are determined in units of pictures such that the amounts of bits are allocated at the ratio defined by the rule (I).

The process of amount-of-bits allocation will be described in detail below.

(2-1) Allocation of amount of bits to I picture (step S3)

An allocated amount of bits AB·I (allocate-bits-I) of the first I picture in a sequence is determined on the basis of an activity A·I (activity-I) of the I picture, calculated in step S2 in FIG. 22, according to the following equation (4) which is set such that the amount of bits is not too large, and the quantization step size of the I picture is not extremely smaller than that of the P picture.

$$AB \cdot I = (C1 * A \cdot I + C2) * CAG \qquad (4)$$

where C1 and C2 are constants.

The allocated amount of bits of each other I picture is determined immediately before coding of the I picture. Based on an amount of bits obtained by correcting the amount of bits of the immediately preceding I picture using an activity, the average quantization step size of the immediately preceding I picture is compared with the average quantization step size of the immediately preceding P1 and P2 pictures. If the quantization step size of the I picture is larger, the allocated amount of bits of the I picture is increased, and vice versa according the following formula (5):

$$AQP \cdot I \cdot P12 = (AQP \cdot P1 + AQP \cdot P2)/2;$$

$$DQ \cdot I \cdot P12 = AQP \cdot I - AQP \cdot P12;$$

if $(DQ \cdot I \cdot P12 \geq 1)$ $AB \cdot I = GBP \cdot I \times$
$AQP \cdot I/(AQP \cdot I - f5(DQ \cdot I \cdot P12)) \times$
$A \cdot I/AP \cdot I \cdot C5;$ else if $(DQ \cdot I \cdot P12 \leq 2)$ $AB \cdot I = GBP \cdot I \times$
$AQP \cdot I/(AQP \cdot I + f6(DQ \cdot I \cdot P12)) \times$
$A \cdot I/AP \cdot I \times C6;$ else $AB \cdot I = GBP \cdot I \times$
$AP \cdot I/A \cdot I$ where DQ (difference qscale) is the quantization step size difference, AQP (averaged qscale previans) is the immediately preceding average quantization step size, GBP (generated bits previous) is the immediately preceding amount of bits, AQP (averaged qscale previans) is the immediately preceding activity, C5 is a constant equal to or larger than 1, C6 is a constant equal to or smaller than 1, and f5 and f6 are functions using a difference DQ·I·P12 between the quantization step sizes of the I picture and the P1 and P2 pictures as a parameter. For example, the functions f5 and f6 are defined by the following equations (6):

$$f5(DQ \cdot I \cdot P12) = \max(1, |DQ \cdot I \cdot P12|)$$

$$f6(DQ \cdot I \cdot P12) = \max(2, |DQ \cdot I \cdot P12|) \qquad (6)$$

As the allocated amount of bits of the I picture is updated in the above-described manner, the ratio of the quantization step sizes of the I picture and the P1 and P2 pictures approaches an optimum value, thus ensuring high coding efficiency.

If the allocated amount of bits determined in the above-described manner exceeds 23% of CAG, the amount of bits is reduced to 23% of CAG. That is, if $$(AB \cdot I > CAG \times 0.23)$$

$$AB \cdot I = CAG \times 0.23 \qquad (7)$$

(2-2) Allocation of amount of bits to P0 picture No allocated amount of bits is determined in advance with respect to the P0 picture. However, the amount of bits of the P0 picture is limited by the rate control in the picture so as not to exceed 25% of the allocated amount of bits of GOP, as will be described below.

(2-3) Allocation of amounts of bits to P1, P2, and B pictures (steps S8, S10, S12, S14, S16, and S18)

The allocated amounts of bits of the P1, P2, and B pictures are determined immediately before coding of the respective pictures in such a manner that the ratio of allocated amounts of bits AR of the P1, P2, and B pictures is set to be AR·P1: AR·P2: AR·B, and the amount of bits of the N pictures coincides with the allocated amount of bits. That is, $$RBG = ABG - GBG = AR \cdot P1 \times RN \cdot P1 + AR \cdot P2 \times RN \cdot P2 + AR \cdot B \times RN \cdot B \qquad (8)$$

where GBG (generated-bits-gop) is the amount of bits which has been generated in the N pictures, and RN (residual-num) ·P1, PN·P2, and RN·B are the numbers of P1, P2, and B pictures, of the N pictures, which have not been coded yet. Generated amounts of bits satisfying this equation are calculated by the following equations, respectively:

$$AB \cdot P1 = AR \cdot P1 \times RBG/(AR \cdot P1 \times RN \cdot P1) + AR \cdot P2 \times RN \cdot P2 + AR \cdot B \times RN \cdot B) \qquad (9)$$

$$AB \cdot P2 = AR \cdot P2 \times RBG/(AR \cdot P1 \times RN \cdot P1) + AR \cdot P2 \times RN \cdot P2 + AR \cdot B \times RN \cdot B) \qquad (10)$$

$$AB \cdot B = AR \cdot B \times RBG/(AR \cdot P1 \times RN \cdot P1) + AR \cdot P2 \times RN \cdot P2 + AR \cdot B \times RN \cdot B) \qquad (11)$$

(2-4) Updating of ratio of allocated amounts of bits of P1, P2, and B pictures

The ratio of the allocated amounts of bits of the P1, P2, and B pictures is set to a certain initial value at the start of a sequence. This ratio is updated immediately before coding of the P1 picture as follows.

(2-4-1) Updating of ratio of allocated code amounts of P1 and P2 pictures

When the P1 and P2 pictures are quantized with the same quantization step size, the ratio of the activities and the ratio of the generated amounts of bits have the following relationship:

$$GB \cdot P2/GB \cdot P1 = C3 \times A \cdot P2/A \cdot P1 - C4 \qquad (12)$$

where C3 and C4 are constants.

The ratio of the allocated amounts of bits of the P1 and P2 pictures is determined on the basis of this relationship as follows:

$$AR \cdot P2/AR \cdot P1 = C3 \times A \cdot P2/A \cdot P1 - C4 \qquad (13)$$

With this updating, the quantization step size of the P1 picture becomes almost equal to that of the P2 picture, thus suppressing a deterioration in picture quality caused when the quantization step size is increased.

(2-4-2) Updating of ratio of allocated bit rates of P1 and B pictures

Figure 31:
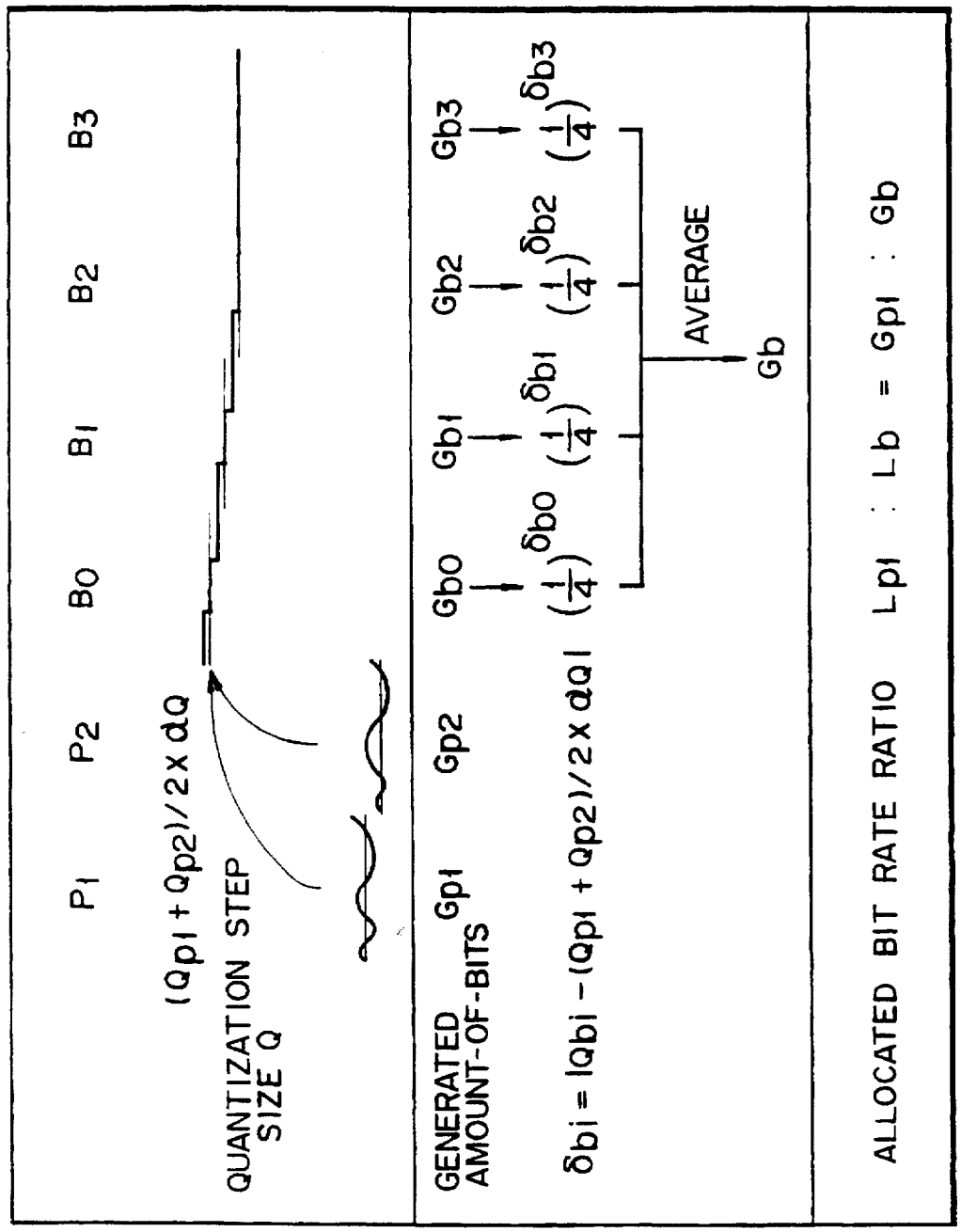
FIG. 31 is a view for explaining a method of determining the ratio between the amounts of bits allocated to the P1 picture and the B picture in the sixth embodiment.

As shown in FIG. 31, Pi picture and those pictures of the B0, B1, B2, and B3 pictures which have quantization step sizes defined by 1: αQ relative to the quantization step size of the P1 picture are weighted, and the generated amounts of bits are averaged, and the allocated amount-of-bits ratio is updated so that it coincides with the ratio of the generated amounts of bits of the P1 and B pictures.

A weighted average amount of bits WAGB (weighted-averaged-generated-bits)·B is calculated first on the basis of the weighted average, i.e., the average quantization step size, and generated amounts of bits of the B0, B1, B2, and B3 according to the following formula (14):

$$WAGB \cdot B = \frac{\sum_{i=0}^{3} \frac{1}{4} \cdot \Delta QBi \cdot \Delta GB \cdot Bi}{\sum_{i=0}^{3} \frac{1}{4} \cdot \Delta QBi} \quad (14)$$

for $\Delta QBi = \{(AQ \cdot P1 + AP \cdot P2)/2 \cdot \alpha Q - AQ \cdot Bi\}$ and $i = 0, \ldots, 3$.

$$AQ \cdot Pj = \frac{1}{NM} \sum_{slice=1}^{NM} Q \cdot Pj(slice) \, j = 0, 1$$

$$AQ \cdot Bi = \frac{1}{NM} \sum_{slice=1}^{NM} Q \cdot Bi(slice) \, i = 0, \ldots, 3$$

This value is an amount of bits obtained by averaging the generated amounts of bits of the B0, B1, B2, and B3 pictures which are respectively weighted by larger values as the deviation from the optimum quantization step size (the quantization step size of the P picture×αQ) is decreased. The ratio of the allocated amounts of bits of the P1 and B pictures is updated according to the following equation (15) to coincide with the ratio of the amount of bits of the P1 picture and the weighted average amount of bits of the B picture:

$$AR \cdot P1/AR \cdot B = GB \cdot P1/WAGB \cdot B \quad (15)$$

When the allocated amount-of-bits ratio is updated in the above-described manner, the ratio of the quantization step sizes of the P and B pictures approaches an optimum ratio, i.e., 1: αQ, thereby allowing optimum amount-of-bits allocation in terms of both coding efficiency and picture quality.

(3) Rate control in picture

In a picture, feedback control is performed in units of slices by using a virtual buffer. The quantization step size of the first slice of the I picture is obtained on the basis of an allocated amount of bits and an activity, whereas that of each of pictures of the other types is determined on the basis of the quantization step size of a picture coded in the past.

(3-1) Quantization step size of first slice of picture

The quantization step size of the first slice of the I picture is determined on the basis of an allocated amount of bits AB·I and a sum A·I of activities in the picture according to the following equation (16):

$$Q \cdot I(1) = C5/AB \cdot I \cdot A \cdot I \quad (16)$$

The quantization step size of the first slice of the P0 picture is determined on the basis of a value obtained by multiplying the average quantization step size of the I picture by a constant αQ0 according to the following equation (17):

$$Q \cdot P0 = \frac{1}{NM} \sum_{slice=1}^{NM} Q \cdot I(slice) \times \alpha Q0 \quad (17)$$

The quantization step size of the first slice of the first P1 picture in the N pictures is determined on the basis of the average quantization step size of the I picture according to the following equation (18):

$$Q \cdot P1(1) = \frac{1}{NM} \sum_{slice=1}^{NM} Q \cdot I(slice) \quad (18)$$

The quantization step size of the first slice of each P1 picture other than the first P1 picture is determined on the basis of the average quantization step size of the immediately preceding P1 picture according to the following equation (19):

$$Q \cdot P1(1) = \frac{1}{NM} \sum_{slice=1}^{NM} QP \cdot P1(slice) \quad (19)$$

The quantization step size of the first slice of the P2 picture is determined on the basis of the average quantization step size of the P1 picture according to the following equation (20), thus preventing a deterioration in picture quality caused when the difference between the quantization step sizes of the P1 and P2 pictures is large.

$$Q \cdot P2(1) = \frac{1}{NM} \sum_{slice=1}^{NM} Q \cdot P1(slice) \quad (20)$$

The quantization step size of the first slice of the B0 picture is determined on the basis of a value obtained by multiplying the average value of the quantization step sizes of the P1 and P2 pictures by αQ according to the following equation (21) such that the ratio between the determined quantization step size and the quantization step sizes of the P1 and P2 pictures is optimized.

$$Q \cdot B0(1) = \frac{\frac{1}{NM} \sum_{slice=1}^{NM} \cdot P1(slice) + \frac{1}{NM} \sum_{slice=1}^{NM} Q \cdot P2(slice)}{2} \cdot \alpha Q \quad (21)$$

The quantization step sizes of the first slices of the B1, B2, and B3 pictures are determined on the basis of the quantization step sizes of the last slices of the B0, B1, and B2 pictures according to the following equations (22):

$$Q \cdot B1(1) = Q \cdot B0(NM)$$

$$Q \cdot B2(1) = Q \cdot B1 \, (NM)$$

$$Q \cdot B3(1) = Q \cdot B2 \, (NM) \quad (22)$$

(3-2) Rate control in I, P1, and P2 pictures

Figure 32:
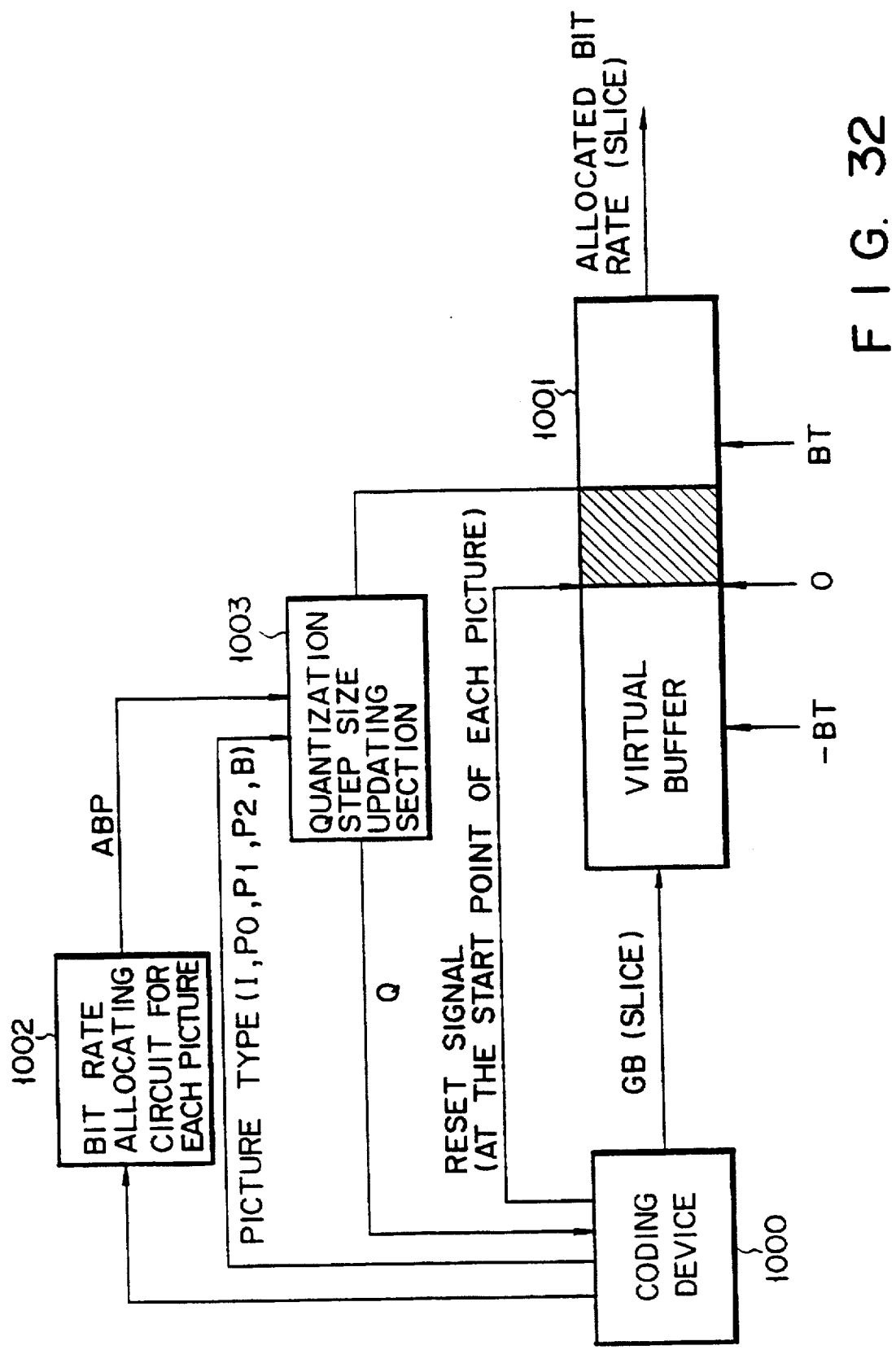
FIG. 32 is a view showing a virtual buffer used for intra-picture rate control in the sixth embodiment.

The quantization step sizes of the I, P1, and P2 pictures are updated in units of slices in a coding apparatus (identical to the apparatus shown in FIG. 17) 800 by a quantization step size updating circuit 803 in accordance with the occupied amount of a virtual buffer 801 shown in FIG. 32.

Prior to coding of each picture, the buffer occupied amount is reset to "0". Code bits GB (slices) generated by the coding apparatus 1000 in units of slices are stored in the buffer 1001, and allocated amount of bits AB (slices) represented by the following equation (23) are read out from the buffer 1001 in units of slices. Note that the allocated amounts of bits are allocated in units of slices as follows, with regard to the I picture, each of amounts of bits allocated in units of pictures is distributed among slices in proportion to the activities of the respective slices. With regard to the P1 and P2 pictures, each of amounts of bits allocated in units of pictures is distributed among slices in proportion to the activities of the slices of an immediately preceding picture of the same type at the same spatial positions. These amounts of bits are allocated in units of picture types by a picture-unit amount-of-bits allocation circuit 1002.

$$AB = \frac{ABP \cdot A(\text{slice})}{\sum_{s=1}^{NM} A(s)} \quad (23)$$

A buffer occupied amount BC (buffer content) is monitored in units of slices. If this buffer occupied amount BC is larger (or smaller) than a threshold value BT (buffer threshold) and is larger (or smaller) than the buffer occupied amount of the previous slice, a quantization step size Q is incremented by one (or decremented by one). Note that the quantization step size Q is limited to 1 to 31. The threshold value BT is defined by the following equation:

$$BT = ABP/NM \times (\tfrac{2}{3})$$

The above description can be expressed as follows:

BC(0) = 0;

for(slice = 1; slice < NM; slice ++)

{BC(slice) = BC(slice − 1) + GB(slice) −

AB(slice);

if (BC(slice) > BT

&&BC(slice) > BC(slice − 1)

&&Q < 31)

Q+ = 1;

else if (BC(slice) < −BT

&&BC(slice) < BT(slice − 1)

&&Q > 1)

Q− = 1;}

In this manner, amounts of bits read out from the buffer in units of slices are allocated in proportion to the activities of the respective slices, and a change in quantization step size is limited to a maximum of q1. In addition, the conditions for a change in quantization step size are made stricter than those in the conventional method. Therefore, the quantization step size is not greatly changed in units of slices, preventing a deterioration in picture quality.

Note that if the amount of bits in the I picture exceeds 25% of the allocated amount of bits of N pictures, all the coefficients are forcibly set to be "0" in the subsequent operation to prevent generation of codes.

(3-3) Rate control in B picture

In the B picture, the same control as that performed for the P1 and P2 pictures is performed except for the following points.

(1) The quantization step size is updated in units of 10 slices.

(2) The execution of update processing is determined only by checking whether the absolute value of the buffer occupied amount exceeds a threshold value, but a comparison with the buffer occupied amount of the previous slide is not performed.

The above description can be expressed as follows:

BC(0) = 0;

for(slice = 1; slice < NM; slice ++)

{BC(slice) = BC(slice − 1) + GB(slice) −

AB(slice);

if (slice %10 == 0){ if (BC(slice) > BT&&Q < 31)

Q+ = 1;

else if (BC (slice) < −BT&&Q > 1)

Q− = 1;}}

The quantization step size of the B picture is updated in units of 10 slices, i.e., at a long period, and a change in quantization step size is limited to a maximum of q1. Therefore, the quantization step size of the B picture is kept to be a value close to the quantization step size of the first slice of the B0 picture, which is set to optimize the coding efficiency, over a long period of time, thus realizing high coding efficiency.

(3-4) Rate control in P0 picture

In the P0 picture, the quantization step size is updated in units of slices in accordance with the occupied amount of the virtual buffer in such a manner that the amount of bits does not exceed 25% of the allocated amount of bits of N pictures. A bit count BOB (buffer-out-bits) read out from the buffer is a value obtained by dividing 20% of the allocated amount of bits of N pictures by the number of slices in the picture according to the following equation:

$$BOB(\text{slice}) = ABG \times 0.20/NM \quad (24)$$

The buffer occupied amount is monitored in units of slices. If the buffer occupied amount exceeds a threshold value, the quantization step size is incremented by one. However, the quantization step size is limited to a maximum of 31. The threshold value is the same as the amount of bits taken out from the buffer. In addition, if the amount of bits in the P0 picture exceeds 25% of the allocated amount of bits of N pictures, control is forcibly performed to prevent generation of codes for all the subsequent macroblocks.

In the P0 picture, rate control is performed only in a special case, e.g., a case wherein the amount of bits is excessively increased. In actual coding operations, such control is very rarely performed. In most cases, the quantization step size of the P0 picture is kept equal to the average quantization step size of the I picture, i.e., the set value of the first slice of the P0 picture. Therefore, the quantization step size of the P0 picture is not greatly changed as compared with the I picture, preventing a deterioration in picture quality.

As described above, since rate control is performed to set constant amounts of bits in units of N pictures, the coding rate can be controlled to be a set value. In addition, the coding efficiency which ensures an optimum step size ratio of the respective pictures can be obtained, and amount-of-bits allocation can be performed to set an amount-of-bits ratio which prevents a deterioration in picture quality. Therefore, the coding efficiency can be considerably improved. Furthermore, since rate control is performed to cause the amount of bits to approach a set amount of bits while a change in quantization step size is limited, the amount of bits can be controlled to be a set value without causing a deterioration in picture quality, which occurs when the quantization step size is excessively changed.

An embodiment of a variable length code decoder will be described below with reference to FIG. 33.

Figure 33:
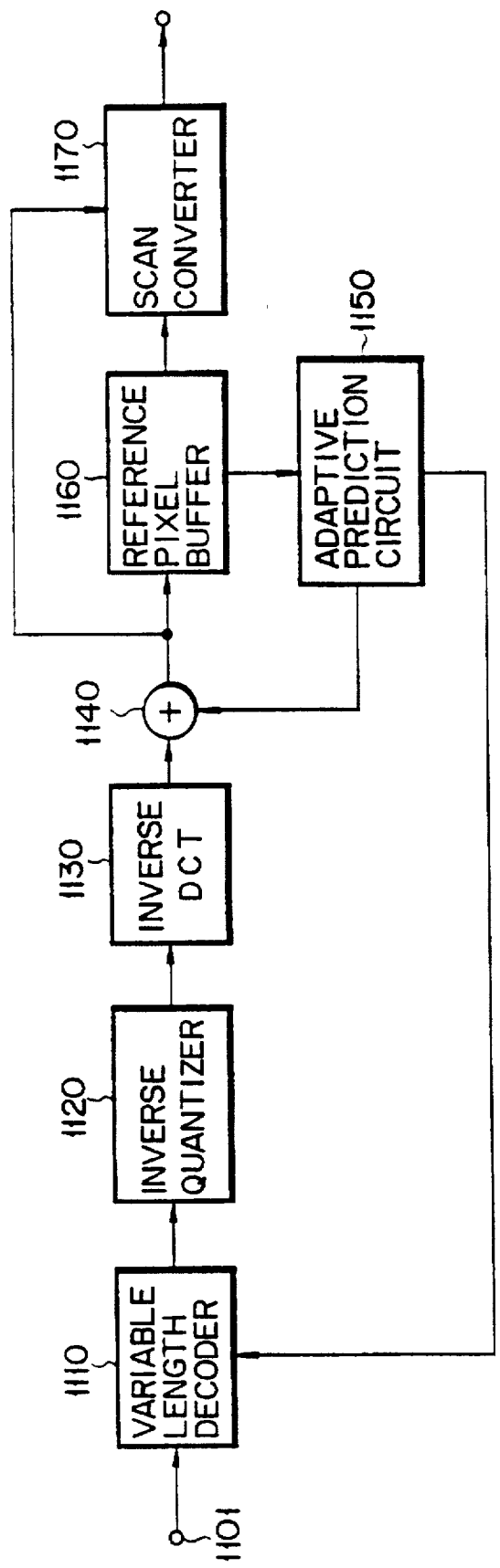
FIG. 33 is a block diagram showing the overall arrangement of a picture decoding system according to the present invention.

Referring to FIG. 33, variable length code data is input to an input terminal 1101 at a predetermined rate. Although this variable length code data is not specifically limited, it is assumed, in this case, that this data includes data obtained by transforming picture data into a coefficient (DCT coefficient) having a small correlation value using DCT (discrete cosine transformation) in combination with adaptive prediction, and quantizing the resultant data, quantization characteristic information, and prediction method information.

A variable length code decoder 1110 decodes the variable length code data and outputs the reproduction picture data to an inverse quantizer 1120 at a pixel rate. In addition, the decoder 1110 outputs the quantization characteristic information and the prediction method information to the inverse quantizer 1120 and an adaptive prediction circuit 1150 at proper timings, respectively. The data inversely quantized by the inverse quantizer 1120 is processed by an inverse DCT circuit 1130, and difference data relative to the adaptive prediction signal is restored.

The difference data output from the inverse DCT circuit 1130 is input to an adder 1140 to be added to the adaptive prediction signal output from the adaptive prediction circuit 1150 so as to reproduce picture data. Of the reproduced picture data, picture data to be referred by the adaptive prediction circuit 1150 is stored in a reference picture temporary storage circuit 1160 and is output to a scan converter 1170 when the next reference picture is input.

The scan converter 1170 serves to change the order of output pixels. The scan converter 1170 switches parallel signals, obtained by scan-converting picture data reproduced/output from the adder 1140 in units of two-dimensional blocks into brightness signals and color signals in units of horizontal scanning lines, and parallel signals, constituted by brightness signals and color signals output from the reference picture temporary storage circuit 1160 in units of horizontal scanning lines, in the original picture order, and outputs them to a picture display unit such as a TV monitor.

The variable length code decoder 1110 shown in FIG. 33 will be described below with reference to FIG. 34.

The variable length code decoder 1110 is mainly constituted by an input data temporary storage circuit 1210 and a code length detection/decoded value transform circuit 1220, as shown in FIG. 34. Variable length code data input to an input terminal 1201 at a predetermined rate is temporarily stored in the input data temporary storage circuit 1210. The input data temporary storage circuit 1210 outputs data associated with the information of at least one coefficient to the code length detection/decoded value transform circuit 1220, in units of the number of bits (M bits) corresponding to the maximum code length of the variable length code, from a bit position designated by code length data 1221 from the circuit 1220, at a pixel rate.

The code length detection/decoded value transform circuit 1220 detects the code length of the variable length code data associated with the information of each pixel, and transforms the variable length code data into a decoded value. The circuit 1220 then transmits the code length data 1221 indicating the code length of the decoded variable length code data to the input data temporary storage circuit 1210 to designate the start bit of the next variable length code data, and also outputs the decoded data to an output terminal 1222.

The input data temporary storage circuit 1210 has the arrangement shown in FIG. 35, in which variable length code data input to an input terminal 1301 at a predetermined rate is temporarily stored in a buffer memory 1310, and the variable length code data is output in parallel in units of M bits designated by an address counter 1320. Code length data indicating the code length of a variable length code decoded at each clock by the code length detection/decoded value transform circuit 1220 in FIG. 34 is input to an input terminal 1331.

An adder 1330 adds data (remainder data) 1341 indicating the remainder obtained by dividing the accumulated bit count of decoded variable length codes by M to variable length data input from the input terminal 1331 at each clock, and outputs the sum data to a one-clock delay circuit 1340. The one-clock delay circuit 1340 outputs the remainder data 1341 to the adder 1330 and a selector 1350, and at the same time outputs data (quotient data) 1342, obtained by dividing the sum data output from the adder 1330 by M, to the address counter 1320 and shift registers 1360 and 1365.

Referring to FIG. 35, M is a power of 2 which is equal to or larger than the maximum code length. With this arrangement, the remainder data 1341 and the quotient data 1342 can be simply obtained on the basis of only outputs from the one-clock delay circuit 1340 without requiring any special circuits for calculating the data 1341 and 1342.

The address counter 1320 increments the read address of the buffer memory 1310 every time the quotient data 1342 indicates that M-bit data is decoded. Loading operations of the shift registers 1360 and 1365 are also controlled by the quotient data 1342 such that M-bit data are sequentially shifted and loaded every time the read address of the buffer memory 1310 is changed. Note that the shift registers 1360 and 1365 are initially set such that data are loaded from the buffer memory 1310 to the registers 1360 and 1365 in units of M bits.

The selector 1350 is designed to perform selection at M:1. The selector 1350 selects M-bit data from the start position of variable length code data in accordance with the remainder data 1341, and outputs the data to an output terminal 1351.

Figure 36:
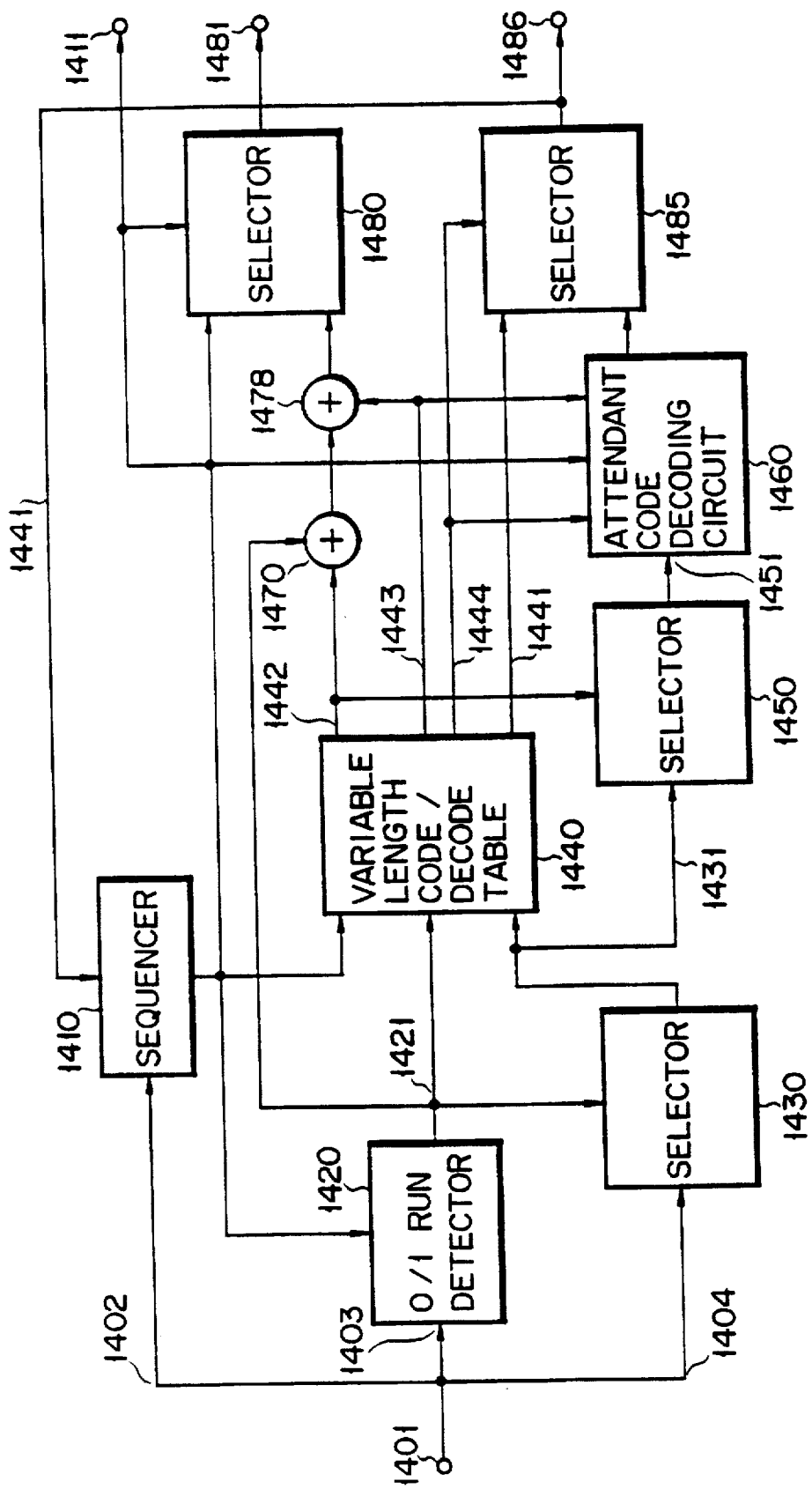
FIG. 36 is a block diagram showing an arrangement of a code length detection/decoded value transform circuit in FIG. 34.

FIG. 36 is a block diagram showing an arrangement of the code length detection/decoded value transform circuit 1220 in FIG. 34. All the bits of M-bit data 1402 input from the input data temporary storage circuit 1210 in FIG. 34 to an input terminal 1401 are input to a sequencer 1410. Upper bits 1403 of the data 1402 are input to a regular pattern length detector 1420. Lower bits 1404 of the data 1402 are input to a selector 1430. The sequencer 1410 detects fixed length control data 1411, and at the same time monitors decoded data 1441 to perform switching and control operations in accordance with the type of data to be decoded next, e.g., switching of the types of variable length code decoding tables 1440 constituted by ROMs, switching of the types of regular patterns detected by the regular pattern length detector 1420, switching of decoding methods in an attendant code decoded value transformer 1460, and control of a selector 1480. The selector 1480 performs switching between the code length of a fixed length code detected by the sequencer 1410 and the code length of a variable length code.

The regular pattern length detector 1420 detects the number of successive "0"s or "1"s (0/1 run), the number of alternately successive "0"s and "1"s in units of a specific number of bits, or the like in accordance with a design rule for a variable length code, and outputs detection data 1421 to the variable length code decoding table 1440, the selector 1430, and an adder 1470.

The selector 1430 outputs lower bit data 1431, obtained by removing the bit count detected by the regular pattern length detector 1420 from the upper bits of the data 1402, to a selector 1450, and outputs data 1432 consisting of upper bits of the data 1431 to the variable length code decoding table 1440.

The variable length code decoding table 1440 outputs a decoded value 1441 corresponding to a variable length code, code length data 1442 following the regular pattern of the variable length code, code length data 1443 following the variable length code, data 1444 indicating whether all the decoded value is expressed by an attendant code, and the like on the basis of the regular pattern length data 1421, the partial data 1431 following the regular pattern, and code type data from the sequencer 1410.

The selector 1450 outputs lower bit data 1451, obtained by removing the bit count indicated by the code length data 1442 from the upper bits of the output data 1431 from the selector 1430, to the attendant code decoded value transformer 1460.

The attendant code decoded value transformer 1460 decodes data accompanying the variable length code by using data of a bit count corresponding to the attendant code length data 1443 of the output data 1451 from the selector 1450 in accordance with a rule designated by the sequencer 1410.

A selector 1485 normally outputs both the decoded value 1441 and the output data from the attendant code decoded value transformer 1460 to an output terminal 1486. If the data 1444 indicates that all the decoded value is expressed by an attendant code, the selector 1485 outputs only the output data from the attendant code decoded value transformer 1460, as a decoded value, to the output terminal 1486.

The adders 1470 and 1478 calculate the code length of the variable length code including the accompanying data, and output the data indicating the code length of the decoded variable length code to an output terminal 1481 through the selector 1480.

FIG. 37 is a block diagram showing another arrangement of the code length detection/decoded value transform circuit 1220, which is suitable for a case wherein a code accompanying a variable length code is a regular variable length code. The difference between this circuit and the circuit shown in FIG. 36 will be mainly described below.

A variable length code decoding table 1540 outputs data 1543 indicating the minimum code length of an attendant code with respect to a decoded variable length code. An attendant code decoded value transformer 1560 outputs data indicating the difference between the code length indicated by the minimum code length data 1543 and the actual attendant code length to an adder 1574. The adder 1574 calculates a table of all the codes for the attendant code on the basis of the difference data.

In this embodiment, no buffer is arranged at a decoded value data output section. If, however, some buffer is used at the decoded value data output section, decoding can be performed at a clock rate slightly higher than a pixel rate, and additional information, such as control data, other than pixel value information, can be decoded with a sufficient margin.

According to the above-described embodiment, at any coding rate, the memory capacity required to convert reproduced picture data into data with a pixel rate can be greatly reduced as compared with the prior art, even if variable length codes of picture data are decoded by clocks corresponding to the pixel rate at a relatively low speed. That is, the operation speed and the memory capacity can be reduced at once.

An embodiment of a video decoding apparatus will be described below with reference to FIG. 38.

Referring to FIG. 38, an input video signal 1610 representing a video constituting a to-be-coded picture is input to a subtracter 1611. The subtracter 1611 calculates the difference between the input video signal 1610 and a prediction video signal 1612 formed in the manner described later, thus forming a predictive difference signal 1613. The predictive difference signal 1613 is subjected to discrete cosine transformation in a DCT (discrete cosine transformation) circuit 1614. The DCT coefficient data obtained by the DCT circuit 1614 is quantized by a quantizer 1615. The signal quantized by the quantizer 1615 is branched in two directions. One signal is coded into a variable length code by a variable length coder 1617 and is converted into data with a predetermined transmission rate by a buffer 1618. The data is then output to a transmission path 1619. The other signal sequentially undergoes processing, in an inverse quantizer 1620 and an IDCT (inverse discrete cosine transformation) circuit 1621, which is inverse to the processing performed by the quantizer 1615 and the DCT circuit 1614. The resultant signal is added to the prediction video signal 1612. With this operation, a local decoded signal 1623 is generated.

The local decoded signal 1623 generated in the above-described manner is selectively input to first and second frame memories 1625 and 1626 through a switch circuit 1624. Motion vectors from first and second motion vector detection circuits 1627 and 1628 are respectively input to the frame memories 1625 and 1626. The motion vector detection circuits 1627 and 1628 respectively detect motions between frames by using the input video signal 1610 and the output signals from the frame memories 1625 and 1626, and generate information indicating the directions and amounts of the motions, i.e., motion vectors. In accordance with these motion vectors, video signals which have undergone motion compensation are read out from the frame memories 1625 and 1626.

Output signals 1631 and 1632 from the frame memories 1625 and 1626 are input to an averaging circuit 1630 and a switch circuit 1634. The averaging circuit 1630 outputs a signal 1633 obtained by averaging the output signals 1631 and 1632 from the frame memories 1625 and 1626. The switch circuit 1634 selects one of the output signals 1631 and 1632 from the frame memories 1625 and 1626 or the output signal from the averaging circuit 1630, and outputs it as the prediction video signal 1612.

A coding control circuit 1627 switches the quantization step sizes in the quantizer 1615 and the inverse quantizer 1620 to finer or coarser step sizes depending on whether the input video signal 1601 represents a first or second type frame, and perform rate control in accordance with the occupied amount of the buffer 1618. In addition, the coding control circuit 1627 performs switching control of the switch circuits 1624 and 1634. Note that switching of the quantization step sizes is performed in accordance with a predetermined rule, e.g., every other frame of an input video signal. The switch circuit 1634 selects a signal having the minimum predictive difference signal 1613 from the output signals 1631, 1632, and 1633 from the frame memories 1625 and 1626 and the averaging circuit 1630 under the control of the coding control circuit 1627.

FIG. 39 is a view illustrating the relationship between to-be-coded frames and reference frames used to form prediction video signals. In this embodiment, as shown in FIG. 39, in coding of to-be-coded frames, frames are classified into first type frames P1, P2, . . . for which a relatively fine quantization step size is used, and second type frames P1', P2', . . . for which a relatively coarse quantization step size is used, and past two first frames relative to to-be-coded frames are used as reference pictures.

In a conventional method, for example, the first type frame P2 is used for the second type frame P2' and the first type frame P3, and the first type frame P3 is used for the second type frame P3' and the first type frame P4. That is, past one first type frame is used as a reference frame. In contrast to this, in this embodiment, for example, the first type frame P1 is used as a reference frame in addition to the first type frame P2 for the to-be-coded frames P2' and P3, and the frame P2 is used as a reference frame in addition to the frame P3 for the to-be-coded frames P3' and P4. That is, one first type frame is additionally used as a reference frame.

Table 3 shows the relationship between to-be-coded frames represented by the input video signal 1610 and input/output of the frame memories 1625 and 1626.

TABLE 3

| Coding | | | | | |
|---|---|---|---|---|---|
| To-be-coded picture | P2 | P2' | P3' | P3 | P4 |
| FM1 output | P0 | P2 | P2 | P2 | P2 |
| FM2 output | P1 | P1 | P1 | P3 | P3 |
| FM1 input | P2 | — | — | — | P4 |
| FM2 input | — | — | P3 | — | — |

As described above, in this embodiment, past two first type frames relative to to-be-coded frames are used as reference frames, one of video signals representing past two first type frames (motion-compensated video signals output from the frame memories 1625 and 1626) or a signal obtained by averaging, i.e., interpolating, the two signals using the averaging circuit 1630 is selected by the switch circuit 1634. That is, a signal having the minimum predictive difference signal 1613 is selected as the prediction video signal 1612. Therefore, in comparison with the conventional method, the hardware size is increased because each of the coding and decoding apparatuses require two frame memories. However, since two first type frames are used as reference frames to form the prediction video signal 1612, the prediction precision is increased, and the coding efficiency is improved. In addition, since future frames are not used as reference frames, an increase in delay time in coding/decoding operations can be prevented.

FIG. 40 is a view illustrating the relationship between to-be-coded frames and reference frames used to form prediction video signals according to another embodiment. In this embodiment, a past frame is additionally used as a reference frame for second type frames P1', P2', P3', . . . in another conventional method.

More specifically, in another conventional method, for example, a frame P2 is used for the frame P2', and a frame P3 is used for the frame P3'. That is, past one first type frame is used as a reference frame. In contrast to this, in this embodiment, for example, a frame P1 is used as a reference frame in addition to the frame P2 for the to-be-coded frame P2', and the frame P2 is used as a reference frame in addition to the frame P3 for the to-be-coded frame P3'. That is, as a first type frame used as a reference frame, past one first type frame second nearest to a to-be-coded frame is added.

Table 4 shows the relationship between to-be-coded frames represented by the input video signal 1610 and input/output of the frame memories 1625 and 1626 in this embodiment.

TABLE 4

| Coding | | | | | |
|---|---|---|---|---|---|
| To-be-coded picture | P2 | P2' | P3' | P3 | P4 |
| FM1 output | P1' | P2 | P2 | P2 | P3' |

TABLE 4-continued

| Coding | | | | | |
|---|---|---|---|---|---|
| FM2 output | P1 | P1 | P2' | P3 | P3 |
| FM1 input | P2 | — | — | P3' | P4 |
| FM2 input | — | P2' | P3 | — | — |

As described above, in this embodiment, since the maximum number (=2) of reference frames is not increased, the hardware size is not increased. In addition, when a to-be-coded frame is a second type frame, since two first type frames can be used as reference pictures to form the prediction video signal 1612, the precision of the prediction video signal 1612 for a second type frame is increased, and the coding efficiency is improved.

In the above-described embodiments, first and second type frames are arranged alternately in terms of time. However, the present invention can be applied to a case wherein first and second type frames are arranged in a different manner in terms of time. In addition, in each embodiment described above, past two frames are used as reference frames. However, the present invention can be used to a case wherein a larger number of reference frames are used.

As has been described above, according to the present invention, when video signals are to be coded by using an inter-frame predictive coding scheme, especially the motion compensation inter-frame predictive coding scheme, the coding efficiency with respect to moving pictures having low intra-frame correlation and high inter-frame correlation, which are generally considered to be difficult to code, can be improved without increasing the delay time in coding/decoding operations, thereby realizing video coding suitable for fields of application requiring a short delay time, e.g., realtime communication.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A video decoding apparatus for decoding a coded signal corresponding to a prediction error signal and a motion vector or a plurality of motion vectors searched within a limited search range, comprising:

means for variable-length decoding the coded signal containing codes corresponding to the motion vector or the motion vectors searched within the limited search range and outputting a variable length decoded prediction error signal and a motion vector used for spatial filtering or a plurality of motion vectors used for spatial-temporal filtering;

decoding means for decoding the variable length decoded prediction error signal to produce a decoded prediction error signal;

means for storing a plurality of local decoded picture signals used as reference picture signals;

prediction signal producing means for producing a prediction picture signal on the basis of the reference picture signals and the motion vector or the motion vectors, said prediction signal producing means including first filtering means for spatial filtering the reference picture signal which is designated by the motion vector in a time advance direction to produce a first prediction signal and second filtering means for spatial-temporal filtering the reference picture signals which are designated by the motion vectors in the time advance direction to produce a second prediction signal, and for producing picture signal, using one of the first and second prediction signals; and means for reproducing a decoded picture signal by adding the decoded prediction error signal and the prediction picture signal.

2. A video decoding apparatus according to claim 1, wherein:

the plurality of reference pictures comprise interlaced picture signals having even and odd fields;

said first filtering means spatial-filters the reference picture signal corresponding to each of the interlaced pictures of the even and odd fields, to produce the first prediction signal; and said second filtering means spatial-temporal filters the reference picture signals corresponding to each of the interlaced pictures of the even and odd fields, to produce the second prediction signal.

3. A video decoding apparatus according to claim 1, wherein the second filtering means includes means for averaging the reference picture signals.

4. A video decoding apparatus according to claim 1, wherein the means for variable-length decoding includes means for variable-length decoding the codes corresponding to one of the motion vectors and a difference between the motion vectors to output a motion vector and a motion vector difference.

5. A video decoding apparatus for decoding a coded signal corresponding to a prediction error signal and a plurality of motion vectors searched within a limited search range, comprising:

means for variable-length decoding the coded signal containing codes corresponding to the motion vectors searched within the limited search range and outputting a variable length decoded prediction error signal and a plurality of corresponding motion vectors;

decoding means for decoding the variable length decoded prediction error signal to produce a decoded prediction error signal;

means for storing a plurality of decoded picture signals as reference picture signals;

prediction signal producing means for producing a prediction picture signal on the basis of the reference picture signals and the motion vectors, said prediction signal producing means including spatial temporal filtering means for spatial-temporal filtering the reference picture signals which are designated by the motion vectors in a time advance direction to produce a spatial temporal filtered signal and for producing the prediction picture signal, using the spatial temporal filtered signal; and means for reproducing a decoded picture signal by adding the decoded prediction error signal and the prediction picture signal.

6. A video decoding apparatus according to claim 5, wherein the plurality of reference picture signals correspond to interlaced pictures of even and odd fields, and said spatial temporal filtering means spatial-filters the reference picture signals corresponding to each of the interlaced pictures of the even and odd fields.

7. A video decoding apparatus according to claim 5, wherein the filtering means includes means for averaging the reference picture signals.

8. A video decoding apparatus according to claim 5, wherein the means for variable-length decoding includes means for variable-length decoding the codes corresponding to one of the motion vectors and a difference between the motion vectors to output a motion vector and a motion vector difference.

9. A method of decoding a coded signal corresponding to a prediction error signal and a motion vector or a plurality of motion vectors searched within a limited search range, comprising the steps of:

(a) variable-length decoding the coded signal containing codes corresponding to the motion vector or the motion vectors searched within the limited search range to obtain a variable length decoded prediction error signal and a motion vector or a plurality of motion vectors;

(b) decoding the variable length decoded prediction error signal to produce a decoded picture prediction error signal;

(c) storing a plurality of local decoded picture signals used as reference picture signals in a memory;

(d) producing a prediction picture signal on the basis of the reference picture signals and the motion vector or the motion vectors, said step (d) including a first step for spatial-filtering the reference picture signal which is designated by the motion vector in a time advance direction to produce a first prediction signal and a second step for spatial-temporal filtering the reference picture signals which are designated by the motion vectors in a time advance direction to produce a second prediction signal, and for producing the prediction picture signal, using one of the first and second prediction signals; and (e) reproducing a decoded picture signal by adding the decoded prediction error signal and the prediction picture signal.

10. A method according to claim 9, wherein:

the plurality of reference picture signals correspond to interlaced pictures having even and odd fields;

said first step spatial-filters the reference picture signal corresponding to each of the interlaced pictures of the even and odd fields, to produce the first prediction signal; and said second step spatial-temporal filters the reference picture signals corresponding to each of the interlaced pictures of the even and odd fields, to produce the second prediction signal.

11. A video decoding method according to claim 9, wherein the second filtering step includes a step of averaging the reference picture signals.

12. A method according to claim 9, wherein the step of variable-length decoding includes a step of variable-length decoding the codes corresponding to one of the motion vectors and a difference between the motion vectors to output a motion vector and a motion vector difference.

13. A method of decoding a coded signal containing codes corresponding to a motion vectors searched within the limited search range, comprising the steps of:

(a) variable-length decoding the coded signal containing codes corresponding to the motion vectors searched within the limited search range and outputting a variable length decoded prediction error signal and a plurality of motion vectors;

(b) decoding the variable length decoded prediction error signal to produce a decoded prediction error signal;

(c) storing a plurality of decoded picture signals as reference picture signals in a memory;

(d) producing a prediction picture signal on the basis of the reference picture signals and the motion vectors, said step (d) including a step for spatial-temporal filtering the reference picture signals which are designated by the motion vectors in a time advance direction to produce a spatial temporal filtered signal and for producing the prediction picture signal, using the spatial temporal filtered signal; and (e) reproducing a decoded picture signal by adding the decoded prediction error signal and the prediction picture signal.

14. A method according to claim 13, wherein the plurality of reference picture signals correspond to interlaced pictures having even and odd fields, and said step (e) spatial-temporal filters the reference picture signals corresponding to each of the interlaced pictures of the odd and even fields.

15. A method according to claim 13, wherein the filtering step includes a step of averaging the reference picture signals.

16. A method according to claim 13, wherein the step of variable-length decoding includes a step of variable-length decoding the codes corresponding to one of the motion vectors and a difference between the motion vectors to output a motion vector and a motion vector difference.

* * * * *